(12) United States Patent
Zhou et al.

(10) Patent No.: US 10,721,409 B2
(45) Date of Patent: Jul. 21, 2020

(54) SYSTEMS AND METHODS FOR EXPOSURE CONTROL

(71) Applicant: ZHEJIANG DAHUA TECHNOLOGY CO., LTD., Hangzhou, Zhejiang (CN)

(72) Inventors: Yanfen Zhou, Hangzhou (CN); Runfa Pan, Hangzhou (CN); Liangcheng Li, Hangzhou (CN); Qianfeng Huang, Hangzhou (CN); Erli Lu, Hangzhou (CN); Mingzhu Chen, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/454,152

(22) Filed: Jun. 27, 2019

(65) Prior Publication Data

US 2019/0320107 A1    Oct. 17, 2019

Related U.S. Application Data

(63) Continuation of application No. PCT/CN2017/116728, filed on Dec. 17, 2017.

(30) Foreign Application Priority Data

Dec. 27, 2016  (CN) .......................... 2016 1 1229065
Jul. 11, 2017   (CN) .......................... 2017 1 0560449

(51) Int. Cl.
   *H04N 5/235*    (2006.01)
(52) U.S. Cl.
   CPC ......... *H04N 5/2353* (2013.01); *H04N 5/2351* (2013.01); *H04N 5/2355* (2013.01)

(58) Field of Classification Search
None
See application file for complete search history.

(56) References Cited

U.S. PATENT DOCUMENTS

| 5,745,808 A | 4/1998 | Tintera |
| 6,421,086 B1 | 7/2002 | Kuno et al. |

(Continued)

FOREIGN PATENT DOCUMENTS

| CN | 101247480 A | 8/2008 |
| CN | 102665047 A | 9/2012 |

(Continued)

OTHER PUBLICATIONS

International Search Report in PCT/CN2017/116728 dated Feb. 24, 2018, 4 pages.

(Continued)

*Primary Examiner* — James M Hannett
(74) *Attorney, Agent, or Firm* — Metis IP LLC

(57) ABSTRACT

The present disclosure relates to systems and methods for exposure control. The systems and methods may obtain a target frame brightness value of the image. The systems and methods may also obtain an exposure mode of the electronic device. The systems and methods may also obtain an exposure table corresponding to the exposure mode. The systems and methods may also determine a target value, corresponding to the target frame brightness value, for each of the one or more exposure parameters based on the exposure table. The systems and methods may also adjust one or more of the at least one lens, the at least one exposure-time controller, and the at least one sensor according to the target values of the one or more exposure parameters.

20 Claims, 7 Drawing Sheets

(56) References Cited

U.S. PATENT DOCUMENTS

| | | | |
|---|---|---|---|
| 7,978,231 B2 | 7/2011 | Proca et al. | |
| 8,810,715 B1 | 8/2014 | Rudin | |
| 9,955,084 B1* | 4/2018 | Haynold | H04N 5/2355 |
| 2005/0264684 A1 | 12/2005 | Kamon et al. | |
| 2006/0062484 A1 | 3/2006 | Aas et al. | |
| 2006/0182430 A1 | 8/2006 | Stavely et al. | |
| 2006/0198627 A1 | 9/2006 | So | |
| 2009/0021603 A1* | 1/2009 | Hsieh | H04N 5/2351 348/230.1 |
| 2009/0284616 A1 | 11/2009 | Daiku | |
| 2010/0097492 A1 | 4/2010 | Ha et al. | |
| 2010/0134650 A1 | 6/2010 | Kim et al. | |
| 2011/0249961 A1* | 10/2011 | Brunner | H04N 5/23216 396/213 |
| 2011/0293259 A1 | 12/2011 | Doepke et al. | |
| 2012/0105668 A1 | 5/2012 | Velarde et al. | |
| 2014/0307117 A1 | 10/2014 | Feng et al. | |
| 2015/0163414 A1 | 6/2015 | Nikkanen et al. | |
| 2015/0237262 A1 | 8/2015 | Hamada et al. | |
| 2016/0212316 A1 | 7/2016 | Nagashima | |
| 2017/0374258 A1* | 12/2017 | Fujita | H04N 5/2351 |
| 2018/0183987 A1* | 6/2018 | Tamura | H04N 5/2353 |

FOREIGN PATENT DOCUMENTS

| | | |
|---|---|---|
| CN | 103546732 A | 1/2014 |
| CN | 103888681 A | 6/2014 |
| CN | 104917976 A | 9/2015 |
| CN | 195578042 A | 5/2016 |
| CN | 105635565 A | 6/2016 |
| CN | 105915816 A | 8/2016 |
| CN | 106657801 A | 5/2017 |
| CN | 106686319 A | 5/2017 |
| CN | 107343157 A | 11/2017 |

OTHER PUBLICATIONS

Written Opinion in PCT/CN2017/116728 dated Feb. 24, 2018, 5 pages.

First Office Action in Chinese Application No. 201611229065.9 dated Feb. 12, 2019, 9 pages.

Partial Supplementary European Search Report in European Application No. 17887589.4 dated Oct. 22, 2019, 14 pages.

International Search Report in PCT/CN2017/107431 dated Jan. 12, 2018, 4 pages.

Written Opinion in PCT/CN2017/107431 dated Jan. 12, 2018, 5 pages.

Partial Supplementary European Search Report in European Application No. 17865891.0 dated Sep. 2, 2019, 13 pages.

The Extended European Search Report in European Application No. 17887589.4 dated Feb. 21, 2020, 15 pages.

* cited by examiner

400

```
┌─────────────────────────────────────────────────────┐
│ Determining a decibel difference between a current  │  401
│ frame brightness value and a target frame           │
│ brightness value                                    │
└─────────────────────────────────────────────────────┘
                          │
                          ▼
┌─────────────────────────────────────────────────────┐
│ Determining a target brightness decibel value       │
│ corresponding to the target frame brightness value  │
│ based on the decibel difference, a current value    │  402
│ for each of one or more exposure parameters, and    │
│ a relationship between a preset value for each of   │
│ the one or more exposure parameters and a preset    │
│ parameter decibel value corresponding to the preset │
│ value                                               │
└─────────────────────────────────────────────────────┘
                          │
                          ▼
┌─────────────────────────────────────────────────────┐
│ Determining a target value, corresponding to the    │
│ target frame brightness value, for each of the one  │
│ or more exposure parameters based on the target     │
│ brightness decibel value, a preset exposure table,  │
│ and the relationship between the preset value for   │  403
│ each of the one or more exposure parameters and     │
│ the preset decibel value corresponding to the       │
│ preset value, and adjusting the one or more         │
│ exposure parameters based on the target value for   │
│ each of the one or more exposure parameters         │
└─────────────────────────────────────────────────────┘
```

FIG. 4

SYSTEMS AND METHODS FOR EXPOSURE CONTROL

CROSS-REFERENCE TO RELATED APPLICATIONS

This application is a continuation of International Application No. PCT/CN2017/116728, filed on Dec. 17, 2017, which claims priority to Chinese Application No. 201611229065.9 filed on Dec. 27, 2016, and Chinese Application No. 201710560449.7 filed on Jul. 11, 2017, the contents of which are incorporated herein by reference in their entirety.

TECHNICAL FIELD

The present disclosure generally relates to image capture, and more particularly relates to systems and methods for automatic exposure control.

BACKGROUND

Automatic exposure refers to that an image capture device automatically adjusts its exposure parameters such as an exposure time, an exposure gain, and an aperture according to different lighting conditions or scenes, so that the brightness of a captured image can achieve expected brightness (e.g., brightness that is neither too dark nor too bright). The automatic exposure in current technology may have adverse effects on the captured image, such as increasing the motion streak (i.e., the apparent streaking of rapidly moving objects in a still image) of the image, or introducing more noise to the image. Therefore, it is desirable to provide methods and systems for automatic exposure to ensure the brightness and the definition of the captured image.

SUMMARY

According to an aspect of the present disclosure, a method for exposure control may be implemented on an electronic device. The electronic device may include at least one lens to intake scenes, at least one exposure-time controller to control an exposure time, at least one sensor to detect a scene from the at least one lens during the exposure time, and at least one processor to receive electronic signals of an image relating to the scene from the at least one sensors during the exposure time, and control the at least one lens, the at least one exposure-time controller, and the at least one sensor. The at least one processor may obtain a target frame brightness value of the image. The at least one processor may obtain an exposure mode of the electronic device. The at least one processor may obtain an exposure table corresponding to the exposure mode. The exposure table may include a plurality of parameter groups each of which includes a preset value of each of one or more exposure parameter of the capture device. The exposure table may include one or more parts in each of which the preset values of one of the one or more exposure parameters are different. The preset values of each of the other exposure parameters may be equal, respectively. The at least one processor may determine a target value, corresponding to the target frame brightness value, for each of the one or more exposure parameters based on the exposure table. The at least one processor may adjust one or more of the at least one lens, the at least one exposure-time controller, and the at least one sensor according to the target values of the one or more exposure parameters.

In some embodiments, to determine the target value, corresponding to the target frame brightness value, for each of the one or more exposure parameters based on the exposure table, the at least one processor may obtain a relationship between the preset value for each of the one or more exposure parameters and a decibel (dB) value corresponding to the preset value. The at least one processor may determine a preset dB value based on the relationship for each preset value in the exposure table. The at least one processor may determine a total dB value by determining a sum of preset dB values of the preset value of each of the one or more exposure parameters in the parameter group for each of the plurality of parameter groups in the exposure table. The at least one processor may determine a target brightness dB value corresponding to the target frame brightness value. The at least one processor may determine the target value for each of the one or more exposure parameters based on the total dB value for each of the plurality of parameter groups in the exposure table and the target brightness dB value.

In some embodiments, to determine the target value for each of the one or more exposure parameters based on the total dB value for each of the plurality of parameter groups in the exposure table and the target brightness dB value, the at least one processor may perform a bisection algorithm on the total dB value for each of the plurality of parameter groups in the exposure table based on the target brightness dB value.

In some embodiments, to determine the target brightness dB value corresponding to the target frame brightness value, the at least one processor may obtain a current frame brightness value and a current value of each of the one or more exposure parameters. The at least one processor may determine a decibel difference between the current frame brightness value and the target frame brightness value. The at least one processor may determine a current dB value for each current value of the one or more exposure parameters based on the relationship. The at least one processor may determine the target brightness dB value by determining a sum of the decibel difference and the current dB value for each current value of the one or more exposure parameters.

In some embodiments, the decibel difference between the current frame brightness value and the target frame brightness value may be determined based on a logarithm of a ratio of the target frame brightness value to the current frame brightness value.

In some embodiments, the plurality of parameter groups may be arranged in ascending order based on the total dB value.

In some embodiments, the exposure mode may include a shutter priority mode, a gain priority mode, and an anti-streak mode.

In some embodiments, the one or more exposure parameters may include the exposure time, the exposure gain, and the aperture.

In some embodiments, for at least one of the one or more parts in the exposure table, the preset values of the one of the one or more exposure parameters that are different may include only a maximum of the one of the one or more exposure parameters and a minimum of the one of the one or more exposure parameters.

According to another aspect of the present disclosure, a method for exposure control may be implemented on an electronic device. The electronic device may include at least one lens to intake scenes, at least one exposure-time controller to control an exposure time, at least one sensor to detect a scene from the at least one lens during the exposure time, and at least one processor to receive electronic signals of an image relating to the scene from the at least one sensors during the exposure time, and control the at least one lens, the at least one exposure-time controller, and the at least one sensor. The at least one processor may obtain a current frame brightness value of the image, a current exposure value of the image, and a target frame brightness value of the image. The at least one processor may determine a target exposure value based on the target frame brightness value, the current frame brightness value, and the current exposure value. The current exposure value and the target exposure value may relate to one or more exposure parameters. The at least one processor may obtain a plurality of candidate values of the one or more exposure parameters based on the target exposure value. The at least one processor may determine a weight corresponding to each of the plurality of candidate values. For each of the one or more exposure parameters, the larger the candidate value is, the smaller the weight corresponding to the candidate value is. The at least one processor may determine a target value for each of the one or more exposure parameters from the plurality of candidate values based on the target exposure value, the plurality of candidate values, and the weight corresponding to each of the plurality of candidate values. The at least one processor may adjust one or more of the at least one lens, the at least one exposure-time controller, and the at least one sensor according to the target values of the one or more exposure parameters.

In some embodiments, to determine the target exposure value based on the current frame brightness value, the target frame brightness value, and the current exposure value, the at least one processor may multiply the current exposure value by the target frame brightness value. The at least one processor may determine the target exposure value by dividing the multiplication result by the current frame brightness value.

In some embodiments, an exposure value relating to the target value for each of the one or more exposure parameters may be equal to the target exposure value. A sum of the weight corresponding to the target value for each of the one or more exposure parameters may be maximum among the plurality of candidate values.

In some embodiments, the one or more exposure parameters may include the exposure time, the exposure gain, and the aperture, and an exposure value relating to the candidate value for each of the one or more exposure parameters may be determined by:

$$E + c_1(T) + c_2(G) + c_3(A),$$

wherein, E refers to the exposure value; T refers to the candidate value of the exposure time, $T = T_1, T_2, \ldots, T_N$, $T_{n-1} < T_n$, $1 < n \leq N$, N is equal to a positive integer greater than 1, $c_1(T)$ refers to a first function that transforms the candidate value of the exposure time into an exposure time decibel value; G refers to the candidate value of the exposure gain, $G = G_1, G_2, \ldots, G_M$, $G_{m-1} < G_m$, $1 < m \leq M$, M is equal to a positive integer greater than 1, $c_2(G)$ refers to a second function that transforms the candidate value of the exposure gain into an exposure gain decibel value; A refers to the candidate value of the aperture, $A = A_1, A_2, \ldots, A_K$, $A_{k-1} < A_k$, $1 < k \leq K$, K is equal to a positive integer greater than 1, and $c_3(A)$ refers to a third function that transforms the candidate value of the aperture into an aperture decibel value.

In some embodiments, to determine the target value for each of the one or more exposure parameters, the at least one processor may determine a plurality of groups each of which includes the candidate value of the exposure time, the candidate value of the exposure gain, and the candidate value of the aperture. The at least one processor may put the plurality of groups into the following equations:

$$E_0 = c_1(T) + c_2(G) + c_3(A),$$

$$\lambda = \lambda_T + \lambda_G + \lambda_A$$

wherein, $E_0$ refers to the target exposure value; $\lambda$ refers to a sum of weights; $\lambda_T$ refers to the weight corresponding to the candidate value of the exposure time, $\lambda_T = \lambda_{T1}, \lambda_{T2}, \ldots, \lambda_{TN}$, $\lambda_{Tn-1} < \lambda_{Tn}$, $1 < n \leq N$, $\lambda_{T1}$ corresponds to $T_1$, $\lambda_{Tn}$ corresponds to $T_n$; $\lambda_G$ refers to the weight corresponding to the candidate value of the exposure gain, $\lambda_G = \lambda_{G1}, \lambda_{G2}, \ldots, \lambda_{GM}$, $\lambda_{Gm-1} < \lambda_{Gm}$, $1 < M \leq M$ $\lambda_{G1}$ corresponds to $G_1$, $\lambda_{Gm}$ corresponds to $G_m$; $\lambda_A$ refers to the weight corresponding to the candidate value of the aperture, $\lambda_A = \lambda_{A1}, \lambda_{A2}, \ldots, \lambda_{AK}$, $\lambda_{Ak-1} < \lambda_{Ak}$, $1 < k \leq K$, $\lambda_{A1}$ corresponds to $A_1$, and $\lambda_{Ak}$ corresponds to $A_k$. The at least one processor may determine one or more candidate groups from the plurality of groups. Each of the one or more candidate groups may make the exposure value relating to the candidate value of the exposure time, the candidate value of the exposure gain, and the candidate value of the aperture in the candidate group equal to the target exposure value, and make the sum of weights corresponding to the candidate value of the exposure time, the candidate value of the exposure gain, and the candidate value of the aperture in the candidate group maximum among the plurality of candidate values. The at least one processor may select one of the one or more candidate groups. The candidate value of the exposure time in the selected group may be the target value of the exposure time. The candidate value of the exposure gain in the selected group may be the target value of the exposure gain. The candidate value of the aperture in the selected candidate group may be the target value of the aperture.

In some embodiments, before obtaining the current frame brightness value of the image, the current exposure value of the image, and the target frame brightness value of the image, the at least one processor may determine that a difference between the current frame brightness value and the target frame brightness value is greater than a threshold. Alternatively or additionally, the at least one processor may determine that the aperture is out of an aperture threshold range corresponding to a lens magnification. Alternatively or additionally, the at least one processor may determine that a threshold range of at least one of the one or more exposure parameters is changed.

According to yet another aspect of the present disclosure, a method for exposure control may be implemented on an electronic device. The electronic device may include at least one lens to intake scenes, at least one exposure-time controller to control an exposure time, at least one sensor to detect a scene from the at least one lens during the exposure time, and at least one processor to receive electronic signals of an image relating to the scene from the at least one sensors during the exposure time, and control the at least one lens, the at least one exposure-time controller, and the at least one sensor. The at least one processor may obtain a target frame brightness value of the image. The at least one processor may obtain an exposure mode of the electronic device. The at least one processor may obtain an exposure table corresponding to the exposure mode. The exposure table may include a plurality of parameter groups each of which includes a preset value of each of one or more exposure parameter of the capture device. The exposure table may include one or more parts in each of which the preset values of one of the one or more exposure parameters are different.

The preset values of each of the other exposure parameters may be equal, respectively. The at least one processor may determine a target value, corresponding to the target frame brightness value, for each of the one or more exposure parameters based on the exposure table. The at least one processor may adjust one or more of the at least one lens, the at least one exposure-time controller, and the at least one sensor according to the target values of the one or more exposure parameters.

According to yet another aspect of the present disclosure, a method for exposure control may be implemented on an electronic device. The electronic device may include at least one lens to intake scenes, at least one exposure-time controller to control an exposure time, at least one sensor to detect a scene from the at least one lens during the exposure time, and at least one processor to receive electronic signals of an image relating to the scene from the at least one sensors during the exposure time, and control the at least one lens, the at least one exposure-time controller, and the at least one sensor. The at least one processor may obtain a current frame brightness value of the image, a current exposure value of the image, and a target frame brightness value of the image. The at least one processor may determine a target exposure value based on the target frame brightness value, the current frame brightness value, and the current exposure value. The current exposure value and the target exposure value may relate to one or more exposure parameters. The at least one processor may obtain a plurality of candidate values of the one or more exposure parameters based on the target exposure value. The at least one processor may determine a weight corresponding to each of the plurality of candidate values. For each of the one or more exposure parameters, the larger the candidate value is, the smaller the weight corresponding to the candidate value is. The at least one processor may determine a target value for each of the one or more exposure parameters from the plurality of candidate values based on the target exposure value, the plurality of candidate values, and the weight corresponding to each of the plurality of candidate values. The at least one processor may adjust one or more of the at least one lens, the at least one exposure-time controller, and the at least one sensor according to the target values of the one or more exposure parameters.

According to yet another aspect of the present disclosure, a non-transitory computer readable medium may comprise executable instructions. When executed by at least one processor of an electronic device, the executable instructions may cause the at least one processor to effectuate the following operations. The at least one processor may obtain a target frame brightness value of the image. The at least one processor may obtain an exposure mode of the electronic device. The at least one processor may obtain an exposure table corresponding to the exposure mode. The exposure table may include a plurality of parameter groups each of which includes a preset value of each of one or more exposure parameter of the capture device. The exposure table may include one or more parts in each of which the preset values of one of the one or more exposure parameters are different. The preset values of each of the other exposure parameters may be equal, respectively. The at least one processor may determine a target value, corresponding to the target frame brightness value, for each of the one or more exposure parameters based on the exposure table. The at least one processor may adjust one or more of at least one lens, at least one exposure-time controller, and at least one sensor in the electronic device according to the target values of the one or more exposure parameters.

According to yet another aspect of the present disclosure, a non-transitory computer readable medium may comprise executable instructions. When executed by at least one processor of an electronic device, the executable instructions may cause the at least one processor to effectuate the following operations. The at least one processor may obtain a current frame brightness value of the image, a current exposure value of the image, and a target frame brightness value of the image. The at least one processor may determine a target exposure value based on the target frame brightness value, the current frame brightness value, and the current exposure value. The current exposure value and the target exposure value may relate to one or more exposure parameters. The at least one processor may obtain a plurality of candidate values of the one or more exposure parameters based on the target exposure value. The at least one processor may determine a weight corresponding to each of the plurality of candidate values. For each of the one or more exposure parameters, the larger the candidate value is, the smaller the weight corresponding to the candidate value is. The at least one processor may determine a target value for each of the one or more exposure parameters from the plurality of candidate values based on the target exposure value, the plurality of candidate values, and the weight corresponding to each of the plurality of candidate values. The at least one processor may adjust one or more of at least one lens, at least one exposure-time controller, and at least one sensor in the electronic device according to the target values of the one or more exposure parameters.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 4 is a flowchart illustrating an exemplary process for determining a target value for each of one or more exposure parameters according to some embodiments of the present disclosure;

DETAILED DESCRIPTION

In the following detailed description, numerous specific details are preset forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2A:
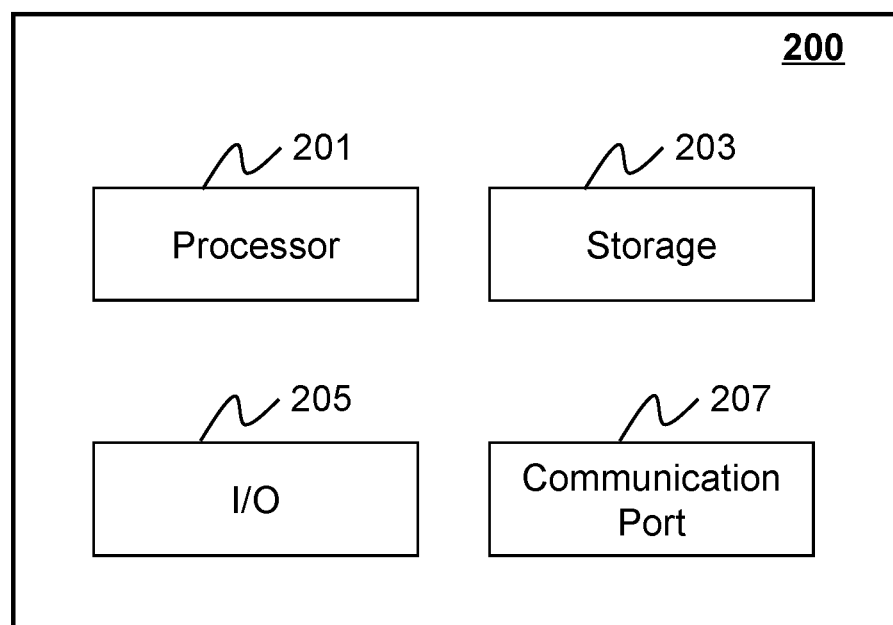
FIG. 2A is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2A) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The following description is provided with reference to systems and methods for automatic exposure. This is not intended to limit the scope the present disclosure. For persons having ordinary skills in the art, a certain amount of variations, changes, and/or modifications may be deducted under the guidance of the present disclosure. Those variations, changes, and/or modifications do not depart from the scope of the present disclosure.

In some embodiments, in the present disclosure, terms "brightness" and "luminance" may be used interchangeably. Terms "photograph," "image," "picture," and "frame" may be used interchangeably to refer to an image captured by a capture device such as a camera.

The present disclosure relates to systems and methods for automatic exposure. According to an aspect of the present disclosure, an electronic devices, such as a camera, that implementing the systems and methods herein may first create and/or obtain a table associated with the image brightness, and the exposure parameters of the camera (e.g., exposure time, the exposure gain, and the aperture of the camera). When shooting an image, the camera may determine the exposure parameters by looking up the table, and then automatically adjust the exposure time, the exposure gain, and the aperture to an idea values to achieve the expected brightness.

According to another aspect of the present disclosure, a weight that reflects the definition of an image captured by a camera may be set for each exposure parameter value of the camera. For an exposure parameter, the larger the exposure parameter value is, the lower the definition of the image is, and the smaller the weight is. The camera may achieve the expected brightness with the target values of the exposure parameters. Further, in order to ensure the definition of the image captured by the camera, the camera may select the target values of the exposure parameters so that the sum of weights corresponding to the target values of the exposure parameters is maximum. The camera then may automatically adjust the exposure time, the exposure gain, and the aperture to an idea values to achieve the expected brightness.

Figure 1:
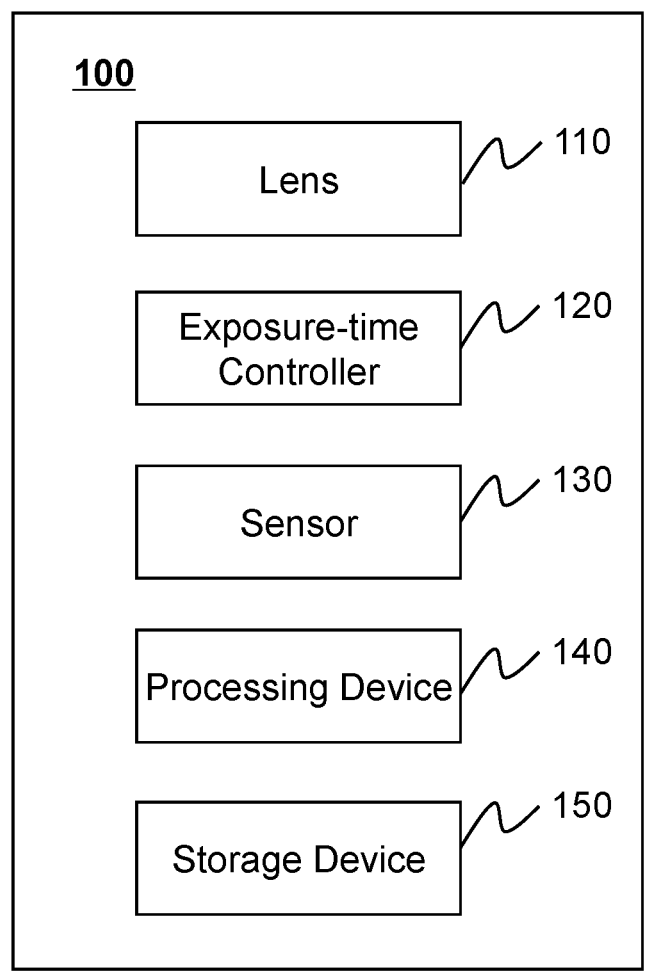
FIG. 1 is a schematic diagram illustrating an exemplary capture device according to some embodiments of the present disclosure.

FIG. 1 is a schematic diagram illustrating an exemplary capture device according to some embodiments of the present disclosure. The capture device 100 may include a lens 110, an exposure-time controller 120, a sensor 130, a processing device 140, and a storage device 150.

The capture device 100 may be a device configured to capture one or more images. As used in this application, an image may be a still image, a video, a stream video, or a video frame obtained from a video. The image may be a three-dimensional (3D) image or a two-dimensional (2D) image. In some embodiments, the capture device 100 may be a digital camera, a video camera, a security camera, a web camera, a smartphone, a tablet, a laptop, a video gaming console equipped with a web camera, a camera with multiple lenses, a camcorder, etc.

The lens 110 may be an optical device that focuses a light beam by means of refraction to form an image. In some embodiments, the lens 110 may include at least one lens. The at least one lens may be configured to intake scenes it is facing at. It may include aperture mechanisms to adjust the aperture of the lens. An aperture of the lens 110 may refer to the size of the hole through which light passes to reach the sensor 130. The larger the aperture is, the more light the lens takes in, and thereby the brighter the image the camera (or the camcorder) (e.g., the capture device 100) produces. The aperture may be adjustable to adjust the amount of light that passes through the lens 110. The focal length of the lens 110 may be adjustable to adjust the coverage of the capture device 100.

The exposure-time controller 120 may be configured to control an exposure time. The exposure time may refer to the length of time when the sensor 130 inside the capture device 100 generates electrical signals. In some embodiments, the exposure-time controller 120 may be a shutter device (e.g., a mechanical shutter) configured to open to allow light to reach the sensor 130 through the lens 110 to make the sensor 130 generate electrical signals when an image is captured. The shutter device may be controlled manually or automatically. The shutter time (e.g., an interval from open to closed) of the shutter device to take pictures of the scenes may be the exposure time. In some embodiments, the sensor 130 does not generate electrical signals without electricity even though light reaches the sensor 130. The exposure-time controller 120 may be an electronic shutter to control the length of time when the sensor 130 is charged with electricity (also referred to as the exposure time). The longer the exposure time is, the more electrical signals the sensor 130 generates, and thereby the brighter the image the camera (or the camcorder) (e.g., the capture device 100) produces.

The sensor 130 may be one or more image sensors or imaging sensors that detects and conveys the scenes taken by the lens 110 into electronic signals of an image (e.g., a digital image). The sensor 130 may include charge coupled device (CCD) and complementary metal-oxide semiconductor (CMOS).

The processing device 140 may be configured to process data and/or information relating to the capture device 100 in the present disclosure. The processing device 140 may be electronically connected to and control the operations of one or more components (e.g., the lens 110, the exposure-time controller 120, the sensor 130) in the capture device 100. For example, the processing device 140 may automatically determine target values of exposure parameters of the capture device 100 such as an exposure time, an exposure gain, and an aperture. As another example, the processing device 140 may automatically adjust the exposure parameters based on the target values of the exposure parameters.

In some embodiments, the processing device 140 may be local or remote. For example, the processing device 140 may communicate with the capture device 100 via wire or wireless connection. As another example, the processing device 140 may be a part of the capture device 100 (as shown in FIG. 1).

The storage device 150 may store data, instructions, and/or any other information. In some embodiments, the storage device 150 may store data obtained from the processing device 140. For example, the storage device 150 may store captured images. In some embodiments, the storage device 150 may store data and/or instructions that the processing device 140 may execute or use to perform exemplary methods described in the present disclosure. For example, the storage device 150 may store data and/or instructions that the processing device 140 may execute or use to perform automatic exposure described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the storage device 150 may be remote or local. For example, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. As another example, the storage device 150 may be connected to a network to communicate with one or more other components of the capture device 100 (e.g., the processing device 140). One or more components of the capture device 100 may access the data or instructions stored in the storage device 150 via the network. As still another example, the storage device 150 may be directly connected to or communicate with one or more other components in the capture device 100 (e.g., the processing device 140). The storage device 150 may be part of the capture device 100.

In some embodiments, the capture device 100 may further include an amplifier, an analog to digital (A/D) converter, and a power source (not shown in FIG. 1). The amplifier may be configured to amplify the electrical signals generated by the sensor 130. The magnification of the electrical signals generated by the sensor 130 may be referred to as an exposure gain. The higher the exposure gain takes, the brighter the image the camera (e.g., the capture device 100) produces (a side effect of a higher gain is that the noise is higher as well). The A/D converter may be configured to transform the amplified electrical signals from the amplifier into digital signals. The digital signals may be transformed to the processing device 140 to generate an image. The image may be stored in the storage device 150.

FIG. 2A is a schematic diagram illustrating exemplary hardware and/or software components of a computing device on which the capture device 100 may be implemented according to some embodiments of the present disclosure. As illustrated in FIG. 2A, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 140 may be implemented on the processor 201 and the processor 201 may determine target values of one or more exposure parameters of the capture device 100. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200 (e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for determining a target value for each of one or more exposure parameters of the capture device 100. As another example, the storage 203 may store images captured by the capture device 100.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 2B:
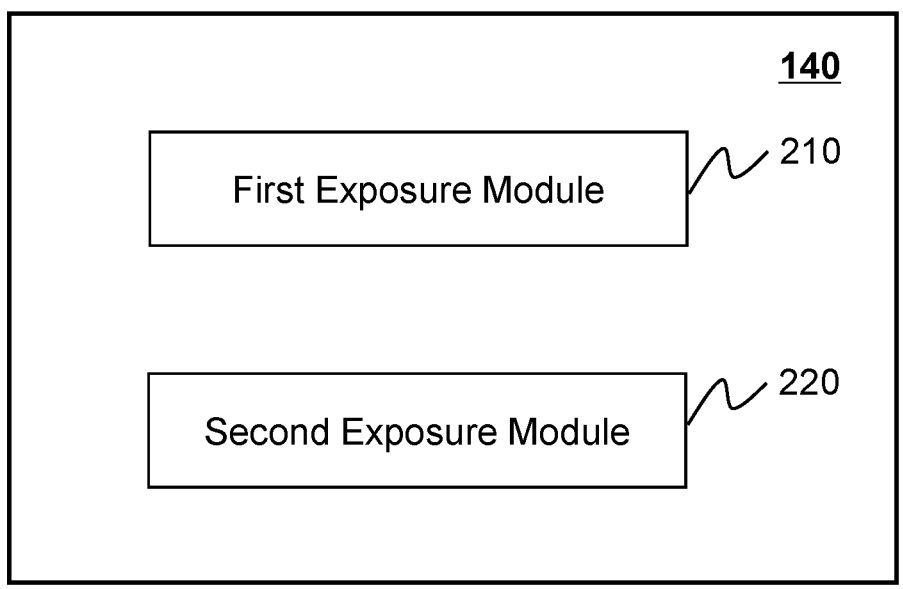
FIG. 2B is a block diagram illustrating an exemplary processing device according to some embodiments of the present disclosure.

FIG. 2B is a block diagram illustrating an exemplary processing device according to some embodiments of the present disclosure. The processing device 140 may include a first exposure module 210 and a second exposure module 210.

In some embodiments, the first exposure module 210 may be configured to determine a target value for each of one or more exposure parameters of the capture device 100 based on one or more tables relating to the one or more exposure parameters.

In some embodiments, the first exposure module 210 may determine a decibel (dB) difference between a current frame brightness value and a target frame brightness value. The first exposure module 210 may also determine a target brightness decibel value corresponding to the target frame brightness value based on the decibel difference, a current value for each of the one or more exposure parameters, and a relationship between a preset value for each of the one or more exposure parameters and a preset parameter decibel value corresponding to the preset value. The first exposure module 210 may further determine the target value, corresponding to the target frame brightness value, for each of the one or more exposure parameters based on the target brightness decibel value, an exposure table, and the relationship between the preset value for each of the one or more exposure parameters and the preset parameter decibel value. The first exposure module 210 may automatically adjust the one or more exposure parameters from the current values to the target values.

In the prior art, the automatic exposure control process for Complementary Metal-Oxide-Semiconductor (CMOS) image sensor imaging may divide light brightness into five levels, create a mathematical model of exposure characteristics, describe the light brightness of each level by the light intensity in this mathematical model, and create a comparison table of corresponding light intensity exposure parameters. The automatic exposure control process may determine a statistics value of the current frame brightness by partition weighting statistics, read current values of the exposure parameters, and determine the light intensity under the mathematical model of exposure characteristics. The automatic exposure control process may further find an appropriate exposure parameter range in the comparison table of the light intensity exposure parameters by looking up the comparison table. This control process may only adjust the frame brightness to a brightness range. Although the number of adjustment steps may be reduced, the accuracy of adjusting the exposure parameters from the current frame brightness to the target frame brightness may not be ensured, and the requirement of dividing the brightness into 5 levels is strict.

According to the process for determining a target value for each of one or more exposure parameters implemented by the first exposure module 210, the first exposure module 210 may adjust the exposure parameters more accurately with fewer steps.

In some embodiments, the second exposure module 220 may be configured to determine a target value for each of one or more exposure parameters of the capture device 100 based on weights of values of the one or more exposure parameters. The second exposure module 220 may determine that an exposure adjustment initiation condition is detected. In response to the determination, the second exposure module 220 may determine a target exposure value by determining a ratio of a product of a current exposure value and a target frame brightness value to a current frame brightness value. The second exposure module 220 may also determine the target value for each of the one or more exposure parameters based on the target exposure value, a value range of the each of the one or more exposure parameters, and a weight range corresponding to the value range of the each of the one or more exposure parameters. The second exposure module 220 may further adjust the one or more exposure parameters based on the target value for each of the one or more exposure parameters.

The automatic exposure in existing technology may have adverse effects on the captured image, such as increasing the motion streak of the image, or introducing more noise to the image. The automatic exposure operation performed by the second exposure module 220 in the present disclosure may make the brightness of the captured image achieve the expected brightness and ensure a relatively high quality of the captured image.

The modules in the processing device 140 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing device 140 may further include a storage module (not shown in FIG. 2B). The storage module may be configured to store data generated during any process performed by any component of in the processing device 140. As another example, each of components of the processing device 140 may include a storage unit. Additionally or alternatively, the components of the processing device 140 may share a common storage unit. As still another example, the first exposure module 210 or the second exposure module 220 may be omitted.

Figure 3:
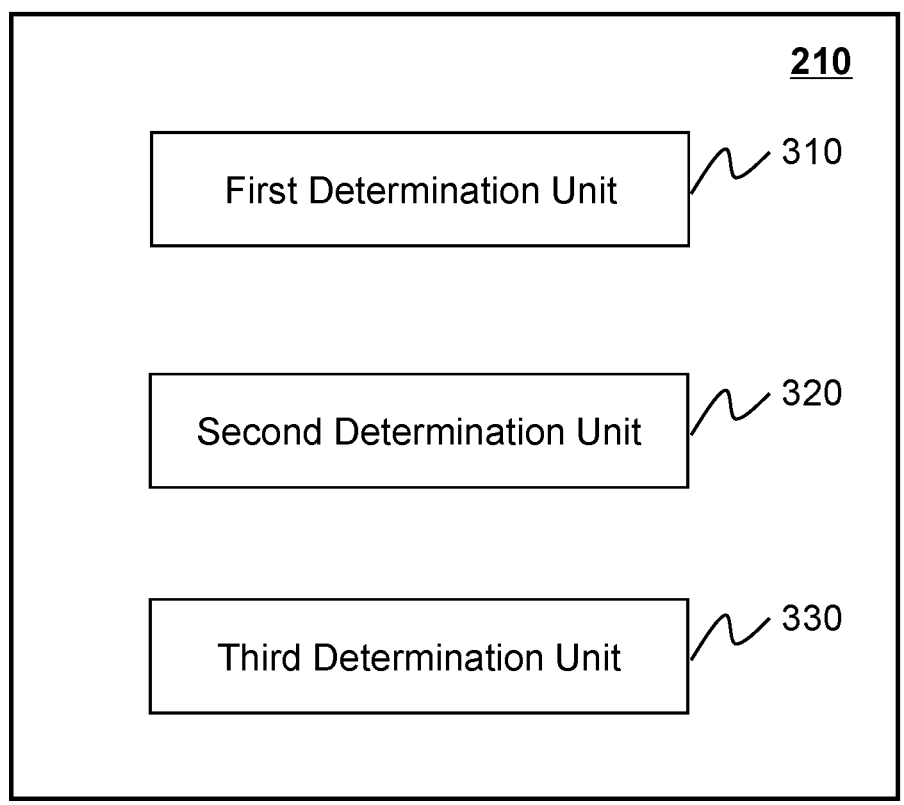
FIG. 3 is a block diagram illustrating an exemplary first exposure module according to some embodiments of the present disclosure.

FIG. 3 is a block diagram illustrating an exemplary first exposure module according to some embodiments of the present disclosure. The first exposure module 210 may include a first determination unit 310, a second determination unit 320, and a third determination unit 330.

In some embodiments, the first determination unit 310 may be configured to determine a decibel difference between a current frame brightness value and a target frame brightness value. In some embodiments, the decibel difference between the current frame brightness value and the target frame brightness value may refer to a decibel value required to adjust the current frame brightness value to the target frame brightness value. In some embodiments, the current frame brightness value may refer to a brightness value of a current image (or frame) captured by the capture device 100 associated with a current time point. The capture time when the current image was captured by the capture device 100 may be closest to the current time point. In some embodiments, the target frame brightness value may refer to a frame brightness value desired by a user of the capture device 100.

In some embodiments, the second determination unit 320 may be configured to determine a target brightness decibel value corresponding to the target frame brightness value based on the decibel difference, a current value for each of one or more exposure parameters, and a relationship between a preset value for each of the one or more exposure parameters and a preset parameter decibel value corresponding to the preset value.

In some embodiments, the one or more exposure parameters may include an exposure time, an exposure gain, and an aperture. The current value for each of the one or more exposure parameters may refer to a value for each of the one or more exposure parameters used to capture the current image. The current value for each of the one or more exposure parameters may correspond to the current frame brightness value.

The current parameter dB values corresponding to the current values of the one or more exposure parameters may be determined based on the current value for each of one or more exposure parameters and the relationship between the preset value for each of the one or more exposure parameters and the preset parameter decibel value corresponding to the preset value. The current brightness dB value may be equal to a sum of the current parameter dB values corresponding to the current values of the one or more exposure parameters. The target brightness dB value may be equal to a sum of the current brightness dB value and the dB difference.

In some embodiments, the third determination unit 330 may be configured to determine a target value, corresponding to the target frame brightness value, for each of the one or more exposure parameters based on the target brightness decibel value, an exposure table, and the relationship between the preset value for each of the one or more exposure parameters and the preset parameter decibel value. The third determination unit 330 may be also configured to adjust the one or more exposure parameters based on the target value for each of the one or more exposure parameters.

The units in the first exposure module 210 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined as a single unit, and any one of the units may be divided into two or more blocks. For example, the first determination unit 310 may be divided into a first block configured to obtain a current frame brightness value and a target frame brightness value, and a second block configured to determine a dB difference between the current frame brightness value and the target frame brightness value.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the first exposure module 210 may further include an adjustment unit configured to automatically adjust the exposure parameters. As another example, the first exposure module 210 may further include a storage unit (not shown in FIG. 3). The storage unit may be configured to store data generated during any process performed by any component of in the first exposure module 210. As still another example, each of components of the first exposure module 210 may include a storage block. Additionally or alternatively, the components of the first exposure module 210 may share a common storage block.

FIG. 4 is a flowchart illustrating an exemplary process for determining a target value for each of one or more exposure parameters according to some embodiments of the present disclosure. In some embodiments, the process 400 may be implemented in the processing device 140 illustrated in FIG. 1. For example, the process 400 may be stored in the storage 203 and/or the storage device 150 as a form of instructions, and invoked and/or executed by the processing device 140 (e.g., the processor 201 illustrated in FIG. 2A, the first exposure module 210 illustrated in FIG. 2B, or one or more units in the first exposure module 210 in the processing device 140 illustrated in FIG. 3). The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 401, the first exposure module 210 (e.g., the first determination unit 310) may determine a decibel difference between a current frame brightness value and a target frame brightness value. In some embodiments, the decibel difference between the current frame brightness value and the target frame brightness value may refer to a decibel value required to adjust the current frame brightness value to the target frame brightness value.

In some embodiments, the unit of the frame brightness value, the unit of the value of the exposure time, the unit of the value of the exposure gain, and the unit of value of the aperture may be different. For the convenience of processing the frame brightness value and the values of one or more exposure parameters (e.g., an exposure time, an exposure gain, an aperture) of the capture device 100, the frame brightness value and the values of the one or more exposure parameters may be transformed into equivalent values with a same unit, such as a decibel (dB) value. The decibel value may be determined based on the logarithm of a ratio of two values.

In some embodiments, the current frame brightness value may refer to a brightness value of a current image (or frame) captured by the capture device 100 associated with a current time point. The capture time when the current image was captured by the capture device 100 may be closest to the current time point. In some embodiments, the current image may be stored in a storage medium (e.g., the storage device 150, the storage 203). The first exposure module 210 may access the storage medium to obtain the current image and determine the current frame brightness value based on the current image.

For example, for a current image in a YUV format, the current frame brightness value may be determined by determining a sum of brightness values of all pixels in the current image and dividing the sum by the total number of the all pixels. As another example, for a current image in an RBG format, a brightness value of a pixel in the current image may be determined according to Equation (1) below:

$$Y=0.3R+0.59G+0.11B, \quad (1)$$

where Y refers to a brightness value of a pixel in the current image, R refers to a brightness value of red of the pixel, G refers to a brightness value of green of the pixel, and B refers to a brightness value of blue of the pixel. The current frame brightness value of the current image in the RGB format may be determined by determining a sum of brightness values of all pixels in the current image and dividing the sum by the total number of the all pixels. In some embodiments, the current frame brightness value may be determined by any technology known in the prior art and detailed descriptions thereof may be omitted.

In some embodiments, the target frame brightness value may refer to a frame brightness value desired by a user of the capture device 100. The first exposure module 210 may obtain the target frame brightness value input by the user. In some embodiment, the target frame brightness value may be default of the capture device 100.

In some embodiments, the first exposure module 210 may determine the decibel difference according to Equation (2) bellow:

$$\text{Adj}DB=20\ \log_{10}(Y\text{target}/Y\text{current}), \quad (2)$$

where Ytarget refers to the target frame brightness value, Ycurrent refers to the current frame brightness value, and AdjDB refers to the decibel difference between the current frame brightness value and the target frame brightness value.

In 402, the first exposure module 210 (e.g., the second determination unit 320) may determine a target brightness decibel value corresponding to the target frame brightness value based on the decibel difference, a current value for each of one or more exposure parameters, and a relationship between a preset value for each of the one or more exposure parameters and a preset parameter decibel value corresponding to the preset value.

In some embodiments, the one or more exposure parameters may include an exposure time, an exposure gain and an aperture. The exposure time may refer to the length of time when the sensor (e.g., the sensor 130) inside the capture device 100 generate electrical signals. In some embodiments, the exposure time may be controlled by the exposure-time controller 120 of the capture device 100. The longer the exposure time is, the more electrical signals the sensor 130 inside the capture device 100 generates, and the larger the brightness value of an image captured by the capture device 100 is. A side effect of a longer exposure time is that the motion streak (i.e., the apparent streaking of rapidly moving objects in a still image) is more obvious in the image captured by the capture device 100 as well. The exposure gain may refer to a magnification of electrical signals (e.g., the electrical signals may be amplified by the amplifier in the capture device 100) generated by a sensor (e.g., the sensor 130) in the capture device 100. The larger the exposure gain is, the larger the brightness value of an image captured by the capture device 100 is. A side effect if a higher exposure gain is that the noise introduced to the image captured by the capture device 100 is more as well. The aperture may refer to the size of a lens (e.g., the lens 110) of the capture device 100. The larger the aperture is, the more the amount of light that reaches the sensor inside the capture device 100 is, and the larger the brightness value of an image captured by the capture device 100 is. A side effect of a larger aperture is that the definition of the image captured by the capture device 100 is lower as well.

The current value for each of the one or more exposure parameters may refer to a value for each of the one or more exposure parameters used to capture the current image. The current value for each of the one or more exposure parameters may correspond to the current frame brightness value. Merely by way of example, when capturing the current image, the capture device 100 may record the current value of each of the one or more exposure parameters and store the current value of each of the one or more exposure parameters in a storage medium (e.g., the storage device 150, the storage 203). The first exposure module 210 may obtain the current value of each of the one or more exposure parameters from the storage medium. In some embodiments, the current value may be determined by any technology known in the prior art and detailed descriptions thereof may be omitted.

In some embodiments, the relationship between the preset value for each of the one or more exposure parameters and the preset parameter dB value corresponding to the preset value may include three types. The first type may be the relationship between a preset value of the exposure time and a preset parameter dB value corresponding to the preset value of the exposure time. The second type may be the relationship between a preset value of the exposure gain and a preset parameter dB value corresponding to the preset value of the exposure gain. The third type may be the relationship between a preset value of the aperture and a preset parameter dB value corresponding to the preset value of the aperture.

In some embodiments, the relationship between the preset value for each of the one or more exposure parameters and the preset parameter dB value may be determined in advance and stored in the storage medium (e.g., the storage device 150, the storage 203).

In some embodiments, the relationship between the preset value for each of the one or more exposure parameters and the preset parameter dB value may be determined in a laboratory environment. The laboratory environment may be an environment with a single light source, constant light brightness, and a fixed lighting scene.

For example, to determine the relationship between the preset value of the exposure time and the preset parameter dB value corresponding to the preset value of the exposure time, the value of the exposure gain and the value of the aperture may be fixed at two spectific values, respectively. In the laboratory environment, the value of the exposure time may be adjusted in an ascending order from a minimum of the exposure time allowed by the capture device 100 to a maximum of the exposure time allowed by the capture device 100. Every time the exposure time of the caputre device 110 is set to a preset value, the caputre device 110 may capture an image and a frame brightness value corresponding to the preset value of the exposure time may be obtained.

The first exposure module 210 may determine a preset parameter dB value corresponding to each preset value of the exposure time based on the frame brightness value corresponding to each preset value of the exposure time. For example, the first exposure module 210 may set a preset value of the expousre time as a reference value and set the preset parameter dB value corresponding to the reference value as 0 dB or a dB value approximately equal to 0 (e.g., 0.1 dB, 0.01 dB, 0.001 dB, 0.5 dB, 0.3 dB). The first exposure module 210 may determine a dB difference between a preset value of the exposure time and the reference value based on the frame brightness value corresponding to the preset value of the exposure time and the frame brightness value corresponding to the reference value. Because the preset parameter dB value corresponding to the reference value is set as 0 dB or a dB value approximately equal to 0, the dB difference between the preset value of the exposure time and the reference value may be determined as the preset parameter dB value corresponding to the preset value of the exposure time. In some embodiments, the dB difference between a preset value of the exposure time and the reference value may be determined based on Equation (3) below:

$$DB_{pre} = 20 \log_{10}(Y_{pre}/Y_{ref}), \quad (3)$$

where $DB_{pre}$ refers to the dB difference between the preset value of the exposure time and the reference value (or the preset parameter dB value corresponding to the preset value of the exposure time), $Y_{pre}$ refers the frame brightness value corresponding to the preset value of the exposure time, and $Y_{ref}$ refers to the frame brightness value corresponding to the reference value.

Table 1 shows the relationship between a preset value of the exposure time and a preset parameter dB value corresponding to the preset value of the exposure time determined based on the process described above. It should be noted that data in Table 1 is showed only for purpose of illustration and does not represent real data.

As shown in Table 1, the unit of the exposure time is "line." In some embodiments, a time unit (e.g., second, millisecond, minute, hour) may be used as the unit of the exposure time. The frame brightness values corresponding to the preset values of the exposure time in Table 1 may be determined in the laboratory environment. As shown in Table 1, a preset value of the exposure time of 1 line may be determined as the reference value. The preset parameter dB values corresponding to other preset values of the exposure time may be determined based on the reference value using Equation (3).

TABLE 1

| Exposure time (Line) | dB |
|---|---|
| 1 | 0.1 |
| 100 | 10 |
| 200 | 20 |
| 300 | 30 |

TABLE 1-continued

| Exposure time (Line) | dB |
|---|---|
| 400 | 40 |
| 500 | 50 |
| 600 | 60 |
| 700 | 70 |
| 800 | 80 |
| 900 | 90 |
| 1000 | 100 |
| ... | ... |

In some embodiments, the process for determining the relationship between a preset value of the exposure gain and a preset parameter dB value corresponding to the preset value of the exposure gain and the process for determining the relationship between a preset value of the aperture and a preset parameter dB value corresponding to the preset value of the aperture may be similar to the process for determining the relationship between a preset value of the exposure time and a preset parameter dB value corresponding to the preset value of the exposure time.

Table 2 shows the relationship between a preset value of the exposure gain and a preset parameter dB value corresponding to the preset value of the exposure gain. It should be noted that data in Table 1 is showed only for purpose of illustration and does not represent real data. The frame brightness values corresponding to the preset values of the exposure gain in Table 2 may be determined in the laboratory environment. As shown in Table 2, a preset value of the exposure gain of 1 may be determined as the reference value. The preset parameter dB values corresponding to other preset values of the exposure gain may be determined based on the reference value.

TABLE 2

| Exposure gain | dB |
|---|---|
| 1 | 0.03 |
| 100 | 3 |
| 200 | 6 |
| 300 | 9 |
| 400 | 12 |
| 500 | 15 |
| 600 | 18 |
| 700 | 21 |
| 800 | 24 |
| 900 | 27 |
| 1000 | 30 |
| ... | ... |

Table 3 shows the relationship between a preset value of the aperture and a preset parameter dB value corresponding to the preset value of the aperture. It should be noted that data in Table 3 is showed only for purpose of illustration and does not represent real data. The frame brightness values corresponding to the preset values of the aperture in Table 3 may be determined in the laboratory environment. As shown in Table 3, a preset value of the aperture of 1 may be determined as the reference value. The preset parameter dB values corresponding to other preset values of the aperture may be determined based on the reference value.

TABLE 3

| Aperture | dB |
|---|---|
| 1 | 0.5 |
| 10 | 5 |
| 20 | 10 |
| 30 | 15 |
| 40 | 20 |
| 50 | 25 |
| 60 | 30 |
| 70 | 35 |
| 80 | 40 |
| 90 | 45 |
| 100 | 50 |
| ... | ... |

In some embodiments, the current parameter dB value corresponding to the current values of the one or more exposure parameters may be determined based on the current values of the one or more exposure parameters and the relationship between the preset value for each of the one or more exposure parameters and the preset parameter dB value corresponding to the preset value (e.g., data in Table 1, Table 2, and Table 3). For example, if the current value of the exposure time is 100 lines, the corresponding current parameter dB value may be 10 dB based on Table 1. If the current value of the exposure gain is 100, the corresponding current parameter dB value may be 3 dB based on Table 2. If the current value of the aperture is 10, the corresponding current parameter dB value may be 5 dB based on Table 3.

In some embodiments, the current brightness dB value corresponding to the current frame brightness value may be equal to the sum of the current parameter dB values corresponding to the current values of the one or more exposure parameters, as illustrated in Equation (4):

$$Y\text{current}DB = \text{tempShut}DB + \text{tempGain}DB + \text{tempApert}DB, \quad (4)$$

where tempshutDB refers to the current parameter dB value corresponding to the current value of the exposure time, tempGainDB refers to the current parameter dB value corresponding to the current value of the exposure gain, and tempApertDB refers to the current parameter dB value corresponding to the current value of the aperture.

In some embodiments, the first exposure module 210 may determine the target brightness dB value corresponding to the target frame brightness value according to Equation (5) bellow:

$$Y\text{target}DB = \text{Adj}DB + Y\text{current}DB, \quad (5)$$

where YtargetDB refers to the target brightness dB value corresponding to the target frame brightness value, and YcurrentDB refers to the current brightness dB value corresponding to the current frame brightness value.

According to Equations (4) and (5), the first exposure module 210 may determine the target brightness dB value corresponding to the target frame brightness value based on Equation (6) bellow:

$$Y\text{target}DB = \text{Adj}DB + \text{tempShut}DB + \text{tempGain}DB + \text{tempApert}DB, \quad (6)$$

In 403, the first exposure module 210 (e.g., the third determination unit 330) may determine a target value, corresponding to the target frame brightness value, for each of the one or more exposure parameters based on the target brightness decibel value, an exposure table, and the relationship between the preset value for each of the one or more exposure parameters and the preset parameter decibel value corresponding to the preset value. After determining of the target values of the one or more exposure parameters, the first exposure module 210 (or the processor of the capture device 100) may control the capture device 100 (e.g., operating the lens 110, the exposure-time controller 120, and the sensor 130) to adjust the aperture, the exposure time, and the exposure gain according to the target values. The first exposure module 210 may then instruct the capture device 100 to take the image with the adjusted aperture, the exposure gain, and the exposure time.

For example, if the first exposure module 210 determines that the target values for the exposure parameters to be {exposure time, exposure gain, aperture}={0.2, 10, F3.5}, then the first exposure module 210 may send electronic signals to the lens 110, the sensor 130 (or the amplifier), and the exposure-time controller 120 of the capture device 100 to adjust the exposure time, the exposure gain, and the aperture according to the exposure parameters.

The exposure table may include a plurality of parameter groups each of which includes a preset value of each of one or more exposure parameter of the capture device 100. The exposure table may include one or more parts in each of which the preset values of one of the one or more exposure parameters are different, and the preset values of each of the other exposure parameters are equal, respectively.

In some embodiments, the exposure table may include a pluraltiy of exposure parameter groups. In some embodiments, each of the plurality of exposure parameter groups may correspond to a frame brightness value and include a preset value of the exposure time, a preset value of the exposure gain, and a preset value of the aperture. In some embodiments, the plurality of exposure parameter groups in the exposure table may be arranged according to the frame brightness values corresponding to the plurality of exposure parameter groups in an ascending order.

In some embodiments, the exposure table may be different in different exposure modes. In some embodiments, the exposure mode may include a shutter priority mode, a gain priority mode, an anti-streak mode, or the like. For example, to generate the exposure table corresponding to the shutter priority mode, the exposure gain may be fixed at a first specific value (e.g., a minimum of the exposure gain allowed by the capture device 100) and the aperture may be fixed at a second specific value (e.g., a minimum of the aperture allowed by the capture device 100). The exposure time may be adjusted from a minimum of the exposure time allowed by the capture device 100 to a maximum of the exposure time allowed by the capture device 100. Then the exposure time may be fixed to the maximum of the exposure time and the aperture may be fixed at the second specific value. The exposure gain may be adjusted from the first specific value to a maximum of the exposure gain allowed by the capture device 100. Then the exposure time may be fixed at the maximum of the exposure time and the exposure gain may be fixed at the maximum of the exposure gain. The aperture may be adjusted from the second specific value to a maximum of the aperture allowed by the capture device 100. Alternatively, after the exposure time is adjusted, the exposure time may be fixed to the maximum of the exposure time and the exposure gain may be fixed at the first specific value. The aperture may be adjusted from the second specific value to a maximum of the aperture allowed by the capture device 100. Then the exposure time may be fixed at the maximum of the exposure time and the aperture may be fixed at the maximum of the aperture. The exposure gain may be adjusted from the first specific value to a maximum of the exposure gain allowed by the capture device 100.

As another example, to generate the exposure table corresponding to the gain priority mode, the exposure time may be fixed at a third specific value (e.g., a minimum of the exposure time allowed by the capture device 100) and the aperture may be fixed at the second specific value (e.g., a minimum of the aperture allowed by the capture device 100). The exposure gain may be adjusted from a minimum of the exposure gain allowed by the capture device 100 to a maximum of the exposure gain allowed by the capture device 100. Then the exposure gain may be fixed at the maximum of the exposure gain and the aperture may be fixed at the second specific value. The exposure time may be adjusted from the third specific value to a maximum of the exposure time allowed by the capture device 100. Then the exposure time may be fixed at the maximum of the exposure time and the exposure gain may be fixed at the maximum of the exposure gain. The aperture may be adjusted from the second specific value to a maximum of the aperture allowed by the capture device 100. Alternatively, after the exposure gain is adjusted, the exposure gain may be fixed to the maximum of the exposure gain and the exposure time may be fixed at the third specific value. The aperture may be adjusted from the second specific value to a maximum of the aperture allowed by the capture device 100. Then the exposure gain may be fixed at the maximum of the exposure gain and the aperture may be fixed at the maximum of the aperture. The exposure time may be adjusted from the third specific value to a maximum of the exposure time allowed by the capture device 100.

In some embodiments, the minimums and the maximums of the one or more exposure parameters may be set according to the feature of the capture device 100 or pixel resolution of the capture device 100. For example, the range of the exposure time may be set as 1 line-300 lines or 1 line-1000 lines, the range of the exposure gain may be set as 0-350 or 0-1023, and the range of the aperture may be set as 0-100.

In some embodiments, for purpose of convenient processing, the exposure table may only include one or more representative exposure parameter groups. For example, the exposure table may include only four exposure parameter groups. The first exposure parameter group may include the minimum of the exposure time, the first specific value of the exposure gain, and the second specific value of the aperture. The second exposure parameter group may include the maximum of the exposure time, the first specific value of the exposure gain, and the second specific value of the aperture. The thrid exposure parameter group may include the maximum of the exposure time, the maximum of the exposure gain, and the second specific value of the aperture. The fourth exposure parameter group may include the maximum of the exposure time, the maximum of the exposure gain, and the maximum of the aperture.

In some embodiments, the exposure tables corresponding to different exposure mode may be generated in advance and stored in a storage medium (e.g., the storage device 150, the storage 203).

In some embodiments, the exposure table may be used to determine the target value for each of the one or more exposure parameters such as an exposure time, an aperture and an exposure gain. For example, when the capture device 100 is in the shutter priority mode, the first exposure module 210 may access the storage medium to look up an exposure table corresponding to the shutter priority mode to determine the target value for each of the one or more exposure parameters. As another example, when the capture device 100 is in the gain priority mode, the first exposure module 210 may access the storage medium to look up an exposure table corresponding to the gain priority mode to determine the target value for each of the one or more exposure parameters.

Table 4 shows an exposure table corresponding to the shutter priority mode. Table 4 may be generated by preferentially adjusting the exposure time. In the embodiment of Table 4, the aperture may be adjusted manually, so the value of the aperture may be fixed during the process for generating the exposure table. When the exposure time is adjusted to the maximum of the exposure time allowed by the capture device 100, the exposure gain may then be adjusted. As shown in Table 4, a row of Table 4 may refer to an exposure parameter group. In Table 4, only the representative exposure parameter group are included. For example, Table 4 may include an exposure parameter group including the minimum (e.g., 1 line) of the exposure time, the minimum (e.g., 0) of the exposure gain, and the fixed value (e.g., 90) of the aperture, an exposure parameter group including the maximum (e.g., 1000 lines) of the exposure time, the minimum (e.g., 0) of the exposure gain, and the fixed value (e.g., 90) of the aperture, and an exposure parameter group including the maximum (e.g., 1000 lines) of the exposure time, the maximum (e.g., 1023) of the exposure gain, and the fixed value (e.g., 90) of the aperture. It should be noted that data in Table 4 is showed only for purpose of illustration and does not represent real data.

TABLE 4

| Exposure time (Lines 1-1000) | Exposure gain (0-1023) | Aperture (0-100) |
|---|---|---|
| 1 | 0 | 90 |
| 1000 | 0 | 90 |
| 1000 | 1023 | 90 |

Table 5 shows an exposure table corresponding to the gain priority mode. Table 5 may be generated by preferentially adjusting the exposure gain. In the embodiment of Table 5, the aperture may be adjusted manually, so the value of the aperture may be fixed during the process for generating the exposure table. When the exposure gain is adjusted to the maximum of the exposure gain allowed by the capture device 100, the exposure time may then be adjusted. As shown in Table 5, a row of Table 5 may refer to an exposure parameter group. In Table 5, only the representative exposure parameter groups are included. For example, Table 5 may include an exposure parameter group including the minimum (e.g., 1 line) of the exposure time, the minimum (e.g., 0) of the exposure gain, and the fixed value (e.g., 90) of the aperture, an exposure parameter group including the minimum (e.g., 1 line) of the exposure time, the maximum (e.g., 1023) of the exposure gain, and the fixed value (e.g., 90) of the aperture, and an exposure parameter group including the maximum (e.g., 1000 lines) of the exposure time, the maximum (e.g., 1023) of the exposure gain, and the fixed value (e.g., 90) of the aperture. It should be noted that data in Table 5 is showed only for purpose of illustration and does not represent real data.

TABLE 5

| Exposure time (Lines 1-1000) | Exposure gain (0-1023) | Aperture (0-100) |
|---|---|---|
| 1 | 0 | 90 |
| 1 | 1023 | 90 |
| 1000 | 1023 | 90 |

In some embodiments, the first exposure module 210 may determine the target value, corresponding to the target frame brightness value, for each of the one or more exposure parameters by generating a virtual table based on the exposure table, and the relationship between the preset value for each of the one or more exposure parameters and the preset parameter decibel value corresponding to the preset value. For each exposure parameter group (e.g., each row) in the exposure table, the first exposure module 210 may determine a decibel value for each exposure parameter in the exposure parameter group and determine a sum of the decibel values of the exposure parameters in the exposure parameter group. It should be noted that the virtual table may be generated during the process 500 or in advance.

For example, for the shutter priority mode, the first exposure module 210 may generate a virtual table (e.g., Table 6) based on Table 1, Table 2, Table 3, and Table 4.

TABLE 6

| Exposure time (Lines 1-1000) | Exposure time (dB) | Exposure gain (0-1023) | Exposure gain (dB) | Aperture (0-100) | Aperture (dB) | Total dB value |
|---|---|---|---|---|---|---|
| 1 | 0.1 | 0 | 0 | 90 | 45 | 45.1 |
| 450 | 45 | 0 | 0 | 90 | 45 | 90 |
| 450 | 45 | 350 | 10.5 | 90 | 45 | 100.5 |

As another example, for the gain priority mode, the first exposure module 210 may generate a virtual table (e.g., Table 7) based on Table 1, Table 2, Table 3, and Table 5. It should be noted that data in Tables 1-5 is shown for purpose of illustration and not limited to a representation of table.

TABLE 7

| Exposure time (Lines 1-1000) | Exposure time (dB) | Exposure gain (0-1023) | Exposure gain (dB) | Aperture (0-100) | Aperture (dB) | Total dB value |
|---|---|---|---|---|---|---|
| 1 | 0.1 | 0 | 0 | 90 | 45 | 45.1 |
| 1 | 0.1 | 350 | 10.5 | 90 | 45 | 55.6 |
| 450 | 45 | 350 | 10.5 | 90 | 45 | 100.5 |

In some embodiments, the first exposure module 210 may determine a range of the target value based on the virtual table and the target brightness decibel value. In some embodiments, the first exposure module 210 may determine the range of the target value in the virtual table by using a bisection algorithm. In some embodiments, the first exposure module 210 may use the bisection algorithm for more than one time to determine the range of the target value in the virtual table.

The first exposure module 210 may determine the target value for each of the one or more exposure parameters based on the range of the target value and the relationship between the preset value for each of the one or more exposure parameters and the preset parameter decibel value.

For example, the capture device 100 is in the shutter priority mode and the target brightness decibel value is determined as 65 dB in 402. The first exposure module 210 may look up Table 6. In the first line of Table 6, the total dB value 45.1 corresponds to the exposure time of 1 line, the exposure gain of 0, and aperture of 90. In the second line of Table 6, the total dB value 90 corresponds to the exposure time of 450 lines, the exposure gain of 0, and the aperture of 90. Since 65 is between 45.1 and 90, the first exposure module 210 may determine that the range of the target value of the exposure time is between 1 line to 450 lines. Since the dB value corresponding to the exposure gain of 0 is 0 dB and the dB value corresponding to the aperture of 90 is 45 dB in the first line and the second line of Table 6, the first exposure module 210 may determine that the dB value corresponding to the target value of the exposure time is 20 dB. The first exposure module 210 may further determine that the target value of the exposure time is 200 lines based on the dB value of 20 dB corresponding to the target value of the exposure time and the relationship between the preset exposure time and the preset parameter dB value in Table 1. Therefore, the first exposure module 210 may determine that the target value of the exposure time is 200 lines, the target value of the exposure gain is 0, and the target value of the aperture is 90. Similarly, for the gain priority mode, the first exposure module 210 may determine a target value for each of the one or more exposure parameters based on Table 1, Table 2, Table 3, Table 5, and Table 7.

In some embodiments, the first exposure module 210 may automatically adjust the one or more exposure parameters from the current values to the target values to achieve the target frame brightness value.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 5:
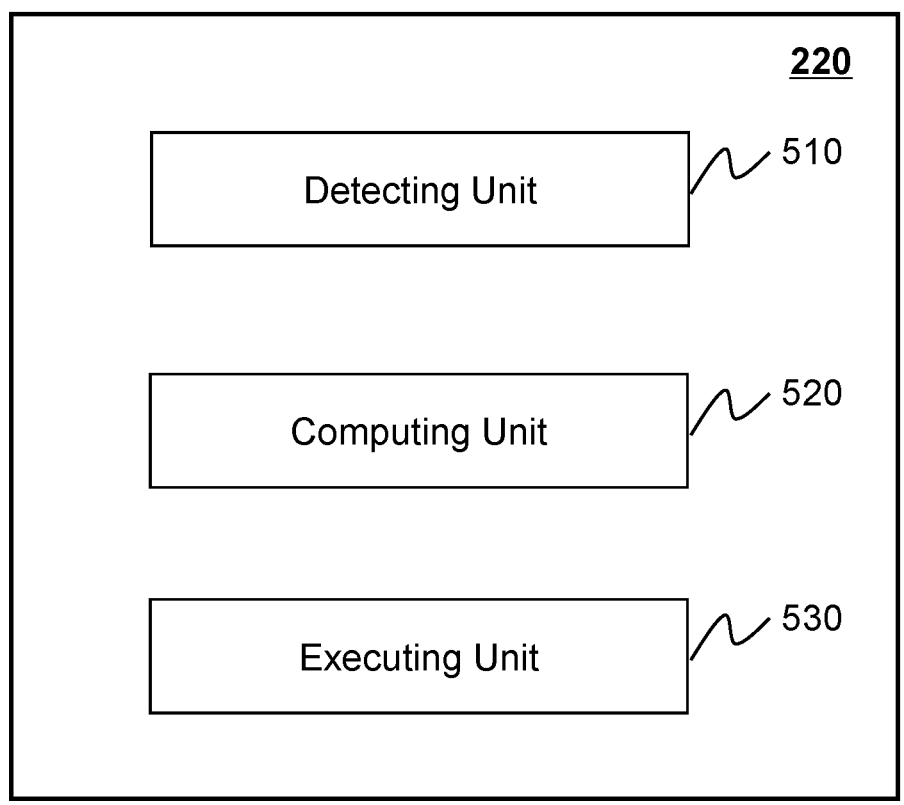
FIG. 5 is a block diagram illustrating an exemplary second exposure module according to some embodiments of the present disclosure.

FIG. 5 is a block diagram illustrating an exemplary second exposure module according to some embodiments of the present disclosure. The second exposure module 220 may include a detecting unit 510, a computing unit 520, and an executing unit 530.

In some embodiments, the detecting unit 510 may be configured to determine that an exposure adjustment initiation condition is detected. The exposure adjustment initiation condition may include one or more of a difference between a current frame brightness value and a target frame brightness value is greater than a threshold, a current value of an aperture of the capture device 100 is out of a range corresponding to a current lens magnification, and a range of an exposure parameter allowed by the camera system 110 is changed, or any combination thereof.

In some embodiments, the computing unit 520 may be configured to determine a target exposure value by determining a ratio of a product of a current exposure value and a target frame brightness value to a current frame brightness value.

In some embodiments, the computing unit 520 may also be configured to determine a target value for each of the one or more exposure parameters based on the target exposure value, a value range of the each of the one or more exposure parameters, and a weight range corresponding to the value range of the each of the one or more exposure parameters. In some embodiments, the value range of an exposure parameter (e.g., the exposure time) may include a plurality of candidate values of the exposure parameter. In some embodiments, the weight range corresponding to the value range of the exposure parameter may include a plurality of weights. A weight may correspond to a candidate value of the exposure parameter.

In some embodiments, the canddiate value of each of the one or more exposure parameters may be proportional to the frame brightness value of an image and inversely proportional to the definition of the image. In some embodiments, the weight may represent the definition of an image. For each of the one or more exposure parameters, the larger the candidate value is, the smaller the weight corresponding to the candidate value may be.

In order to ensure the brightness of the image captured by the camera, the expected brightness may be achieved when the camera captures an image using the target values of the exposure parameters. In order to ensure the definition of the image captured by the camera, the sum of weights corresponding to the target values of the exposure parameters may be maximum.

In some embodiments, the executing unit 530 may be configured to adjust the one or more exposure parameters based on the target value for each of the one or more exposure parameters.

The units in the second exposure module 220 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the units may be combined as a single unit, and any one of the units may be divided into two or more blocks. For example, the computing unit 520 may be divided into a first block configured to determine a target exposure value, and a second block configured to determine a target value for each exposure parameter.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the second exposure module 220 may further include a storage unit (not shown in FIG. 5). The storage unit may be configured to store data generated during any process performed by any component of in the second exposure module 220. As another example, each of components of the second exposure module 220 may include a storage block. Additionally or alternatively, the components of the second exposure module 220 may share a common storage block.

Figure 6:
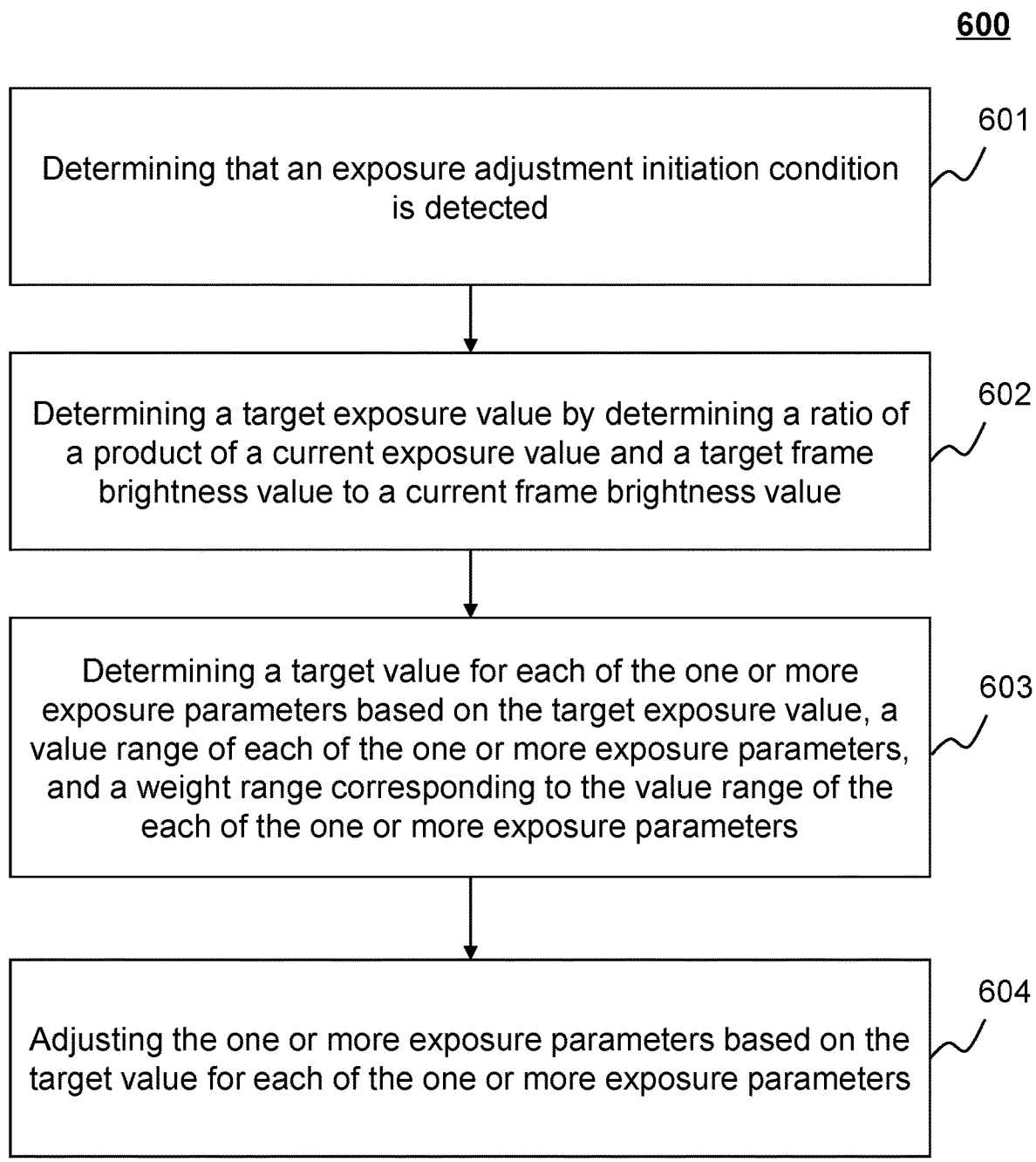
FIG. 6 is a flowchart illustrating an exemplary process for determining a target value for each of one or more exposure parameters according to some embodiments of the present disclosure.

FIG. 6 is a flowchart illustrating an exemplary process for determining a target value for each of one or more exposure parameters according to some embodiments of the present disclosure. In some embodiments, the process 600 may be implemented in the processing device 140 illustrated in FIG. 1. For example, the process 600 may be stored in the storage 203 and/or the storage device 150 as a form of instructions, and invoked and/or executed by the processing device 140 (e.g., the processor 201 illustrated in FIG. 2A, the second exposure module 220 illustrated in FIG. 2B, or one or more units in the second exposure module 220 in the processing device 140 illustrated in FIG. 5). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 601, the second exposure module 220 (e.g., the detecting unit 510) may determine that an exposure adjustment initiation condition is detected. To this end, the seond exposure module 220 may obtain the current frame brightness (or image brightness) value of an image it is taking or taken, the current exposure value of the image, and a target frame brightness value of the image. The second exposure module 220 may determine a difference between the current frame brightness value and the target frame brightness value. The exposure adjustment initiation condition may be that the difference is greater than a threshold, a current value of an aperture of the capture device 100 is out of a range corresponding to a current lens magnification, and/or a range of an exposure parameter allowed by the camera system 110 is changed or any combination thereof. In some embodiments, the threshold, the ranges of the one or more exposure parameters allowed by the capture device 100, and the ranges of the aperture corresponding to different lens magnifications may be set by the user of the camera system 110 or default of the camera system 110.

The one or more exposure parameters may include an exposure time, an exposure gain, and an aperture value (or an aperture). The exposure time may refer to the length of time when the sensor (e.g., the sensor 130) inside the capture device 100 generate electrical signals. In some embodiments, the exposure time may be controlled by the exposure-time controller 120 of the capture device 100. The longer the exposure time is, the more electrical signals the sensor 130 inside the capture device 100 generates, and the larger the brightness value of an image captured by the capture device 100 is. A side effect of a longer exposure time is that the motion streak (i.e., the apparent streaking of rapidly moving objects in a still image) is more obvious in the image captured by the capture device 100 as well. The exposure gain may refer to a magnification of electrical signals (e.g., the electrical signals may be amplified by the amplifier in the capture device 100) generated by a sensor (e.g., the sensor 130) in the capture device 100. The larger the exposure gain is, the larger the brightness value of an image captured by the capture device 100 is. A side effect if a higher exposure gain is that the noise introduced to the image captured by the capture device 100 is more as well. The aperture may refer to the size of a lens (e.g., the lens 110) of the capture device 100. The larger the aperture is, the more the amount of light that reaches the sensor inside the capture device 100 is, and the larger the brightness value of an image captured by the capture device 100 is. A side effect of a larger aperture is that the definition of the image captured by the capture device 100 is lower as well.

In some embodiments, the second exposure module 220 may initiate the automatic exposure control (e.g., 602-604) described in the embodiment of the present disclosure when the difference between the current image brightness value and the target frame brightness value is greater than the threshold.

In some embodiments, the current frame brightness value may refer to a brightness value of a current image (or frame) captured by the capture device 100 associated with a current time point. The capture time when the current image was captured by the capture device 100 may be closest to the current time point. For example, for a video monitoring device, the current frame brightness value may be the brightness value of a video frame captured by the video monitoring device at the current time point or a prior time point closest to the current time point. As another example, for a photographing device, the current frame brightness value may be the brightness value of a picture captured by the photographing device at the current time point or a prior time point closest to the current time point.

In some embodiments, the current image may be stored in a storage medium (e.g., the storage device 150, the storage 203). The second exposure module 220 may access the storage medium to obtain the current image and determine the current frame brightness value based on the current image.

For example, for a current image in a YUV format, the current frame brightness value may be determined by determining a sum of brightness values of all pixels in the current image and dividing the sum by the total number of the all pixels. As another example, for a current image in an RBG format, a brightness value of a pixel in the current image may be determined according to Equation (1). The current frame brightness value of the current image in the RGB format may be determined by determining a sum of brightness values of all pixels in the current image and dividing the sum by the total number of the all pixels. In some embodiments, the current frame brightness value may be determined by any technology known in the prior art and detailed descriptions thereof may be omitted.

In some embodiments, the target frame brightness value may refer to a frame brightness value desired by a user of the capture device 100. The second exposure module 220 may obtain the target frame brightness value input by the user. In some embodiment, the target frame brightness value may be default of the capture device 100.

In some embodiments, the second exposure module 220 may initiate the automatic exposure control (e.g., 602-604) described in the embodiment of the present disclosure when the current value of the aperture is out of the range of the aperture corresponding to the current lens magnification. In some embodiments, for each lens magnification, a range of the aperture may be preset to match the lens magnification. For a specific lens magnification, if the value of the aperture is out of the preset range corresponding to the lens magnification, problems such as introducing stray light and making the image definition reduced may be led to the image captured by the capture device 100. Therefore, in order to ensure the quality of the captured image, the current value of the aperture may be required to be within the preset range of the aperture corresponding to the current lens magnification.

In some embodiments, during zooming of the lens of the capture device 100, if the current value of the aperture is out of the range of the aperture corresponding to the current lens magnification, the second exposure module 220 may perform the operation of automatic exposure control (e.g., 602-604). Therefore, it can be seen that the method provided in this embodiment in FIG. 6 considers the influence of the aperture on the image definition during zooming of the lens, and the quality of the captured image may be further improved.

In some embodiments, the second exposure module 220 may initiate the automatic exposure control (e.g., 602-604) described in the embodiment of the present disclosure when the range allowed by the camera system 110 of any one of the one or more exposure parameters is changed.

In 602, the second exposure module 220 (e.g., the computing unit 520) may determine a target exposure value by determining a ratio of a product of a current exposure value and a target frame brightness value to a current frame brightness value (e.g., as shown in Equation (8)).

In some embodiments, the unit of the frame brightness value, the unit of the value of the exposure time, the unit of the value of the exposure gain, and the unit of value of the aperture may be different. For the convenience of processing the frame brightness value and the values of the one or more exposure parameters of the capture device 100, the frame brightness value and the values of the one or more exposure parameters may be transformed into equivalent values with a same unit, such as a decibel (dB) value.

The exposure value may correspond to a frame brightness value and be equal to a sum of the equivalent values of the one or more exposure parameters that are used to achieve the frame brightness value. For example, the exposure value may be determined based on Equation (7) below:

$$E=c_1(T)+c_2(G)+c_3(A), \quad (7)$$

where E refers to the exposure value; T refers to the value of the exposure time, $T=T_1, T_2, \ldots, T_N, T_{n-1}<T_n, 1<n\leq N$, N is equal to a positive integer greater than 1, $c_1(T)$ refers to a first function that transforms the value of the exposure time into an exposure time equivalent value (e.g., an exposure time dB value); G refers to the value of the exposure gain, $G=G_1, G_2, \ldots, G_M, G_{m-1}<G_m, 1<m\leq M$, M is equal to a positive integer greater than 1, $c_2(G)$ refers to a second function that transforms the value of the exposure gain into an exposure gain equivalent value (e.g., an exposure gain dB value); A refers to the value of the aperture, $A=A_1, A_2, \ldots, A_K, A_{k-1}<A_k, 1<k\leq K$, K is equal to a positive integer greater than 1, and $c_3(A)$ refers to a third function that transforms the value of the aperture into an aperture equivalent value (e.g., an aperture decibel value).

Merely by way of example, the equivalent value may be the decibel value. The decibel value may be determined based on the logarithm of a ratio of two values. For the exposure time, under a preset lighting scene, the exposure gain and the aperture may be fixed at two specific values, respectively. The minimum T_min of the exposure time may correspond to a frame brightness value Y_min. With the same lighting scene and the same specific values of the exposure gain and the aperture, the value $T_N$ of the exposure time may correspond to a frame brightness value $Y_N$. The second exposure module 220 may determine a dB value $c_1(T_N)$ by determining a result of $20 \log_{10}(Y_N/Y\_min)$. The second exposure module 220 may determine other dB values corresponding to other values of the exposure time, a dB value corresponding to a value of the exposure gain, and a dB value corresponding to a value of the aperture in a same way. Detailed descriptions thereof will be omitted in this embodiment.

According to Equation (7), the second exposure module 220 may determine the current exposure value by determining the sum of a dB value of a current value of the exposure time, a dB value of a current value of the exposure gain, and a dB value of a current value of the aperture. The current value for each of the one or more exposure parameters may refer to a value for each of the one or more exposure parameters used to capture the current image and achieve the current frame brightness value. The current value for each of the one or more exposure parameters may correspond to the current frame brightness value, and the combination of the current values of the one or more exposure parameters may result the current frame brightness.

In some embodiments, a ratio of a frame brightness value to an exposure value corresponding to the frame brightness value may be a fixed value in a specific light environment. Therefore, the target exposure value corresponding to the target frame brightness value may be determined based on the target image brightness value and the ratio of the current frame brightness value to the current exposure value, as illustrated in Equation (8).

$$E\text{target}=(E\text{current}*Y\text{target})/Y\text{current}, \quad (8)$$

where Ycurrent refers to the current frame brightness value, Ecurrent refers to the current exposure value, Ytarget refers to the target frame brightness value, and Etarget refers to the target exposure value.

In 603, the second exposure module 220 (e.g., the computing unit 520) may determine a target value for each of the one or more exposure parameters based on the target exposure value, a value range of each of the one or more exposure parameters, and a weight range corresponding to the value range of each of the one or more exposure parameters. After determining of the target values of the one or more exposure parameters, the second exposure module 220 (or the processor of the capture device 100) may control the capture device 100 (e.g., operating the lens 110, the exposure-time controller 120, and the sensor 130) to adjust the aperture, exposure time, and the exposure gain according to the target values. The second exposure module 220 may then instruct the capture device to take the image with the adjusted aperture, the exposure gain, and the exposure time.

For example, if the second exposure module 220 determines that the target values for the exposure parameters to be {exposure time, exposure gain, aperture}={0.2, 10, F3.5}, then the second exposure module 220 may send electronic signals to the lens 110, the sensor 130, and the exposure-time controller 120 of the capture device 100 to adjust the exposure time, the exposure gain, and the aperture according to the exposure parameters.

In some embodiments, the value range of an exposure parameter (e.g., the exposure time) may include a plurality of candidate values of the exposure parameter. In some embodiments, the weight range corresponding to the value range of the exposure parameter may include a plurality of weights. A weight may correspond to a candidate value of the exposure parameter.

In some embodiments, the canddiate value of each of the one or more exposure parameters may be proportional to the frame brightness value of an image and inversely proportional to the definition of the image. In some embodiments, the weight may represent the definition of an image. For each of the one or more exposure parameters, the larger the candidate value is, the smaller the weight corresponding to the candidate value may be.

In some embodiments, the second exposure module 220 may determine one or more candidate parameter groups each of which includes a candidate value of each of the one or more exposure parameters (e.g., a candidate value of the exposure time, a candidate value of the exposure gain, and a candidate value of the aperture). In some embodiments, for each of the one or more candidate parameter groups, its exposure value may be equal to the target exposure value and the sum of weights corresponding to the candidate values of the one or more exposure parameters may be maximum among the plurality of candidate values.

In some embodiments, for the exposure time, its canddaite values in the value range may be represented as $T=T_1, T_2, \ldots, T_N, T_{n-1}<T_n, 1<n\leq N$, N is equal to a positive integer greater than 1. In some embodiments, the shorter the exposure time is, the smaller the frame brightness value of a captured image may be, and the slighter the streak caused by movement of an object in the captured image may be. On the other hand, the longer the exposure time is, the greater the frame brightness value of a captured image may be, and the more obvious the streak caused by movement of an object in the captured image may be. In some embodiments, a weight range corresponding to the value range of the exposure time for characterizing the image definition may be represented as $\lambda_T=\lambda_{T1}, \lambda_{T2}, \ldots, \lambda_{TN}, \lambda_{Tn-1}<\lambda_{Tn}, 1<n\leq N$, corresponding to $T_1, T_2, \ldots, T_N$, respectively. In some embodiments, the smaller the canddiate value of the exposure time is, the larger the weight corresponding to the candidate value of the exposure time may be.

In some embodiments, for the exposure gain, its canddaite values in the value range may be represented as $G=G_1, G_2, \ldots, G_M$, $G_{m-1}<G_m$, $1<M\leq M$, M is equal to a positive integer greater than 1. In some embodiments, the smaller the exposure gain is, the smaller the frame brightness value of a captured image may be, and the more the noise introduced to the captured image may be. On the other hand, the larger the exposure gain is, the larger the frame brightness value of a captured image may be, and the less the noise introduced to the captured image may be. In some embodiments, a weight range corresponding to the value range of the exposure gain for characterizing the image definition may be represented as $\lambda_G=\lambda_{G1}, \lambda_{G2}, \ldots, \lambda_{GM}$, $\lambda_{Gm-1}<\lambda_{Gm}$, $1<m\leq M$, corresponding to $G_1, G_2, \ldots, G_M$, respectively. In some embodiments, the smaller the canddiate value of the exposure gain is, the larger the weight corresponding to the candidate value of the exposure gain may be.

In some embodiments, for the aperture, its canddaite values in the value range may be represented as $A=A_1, A_2, \ldots, A_K$, $G_{k-1}<G_k$, $1<k\leq K$, K is equal to a positive integer greater than 1. In some embodiments, the larger the aperture is, the larger the frame brightness value of a captured image may be, the shallower the depth of field of the captured image may be, and the more the stray light introduced to the captured image may be. On the other hand, the smaller the aperture is, the smaller the frame brightness value of a captured image may be, the deeper the depth of field of the captured image may be, and the less the stray light introduced to the captured image may be. In some embodiments, a weight range corresponding to the value range of the aperture for characterizing the image definition may be represented as $\lambda_A=\lambda_{A1}, \lambda_{A2}, \ldots, \lambda_{AK}$, $\lambda_{Ak-1}<\lambda_{Ak}$, $1<k\leq K$, corresponding to $A_1, A_2, \ldots, A_K$, respectively. In some embodiments, the smaller the canddiate value of the aperture is, the larger the weight corresponding to the candidate value of the aperture may be.

In some embodiments, the maximum and the minimum of the weight range corresponding to the value range of any one of the one or more exposure parameters may be preset. For an exposure parameter (e.g., the exposure time), the intermediate values between the maximum and the minimum of the weight range may be determined based on the candidate values in the value range of the exposure parameter using an interpolation algorithm.

In some embodiments, the second exposure module 220 may determine a plurality of parameter groups each of which includes the candidate value of the exposure time, the candidate value of the exposure gain, and the candidate value of the aperture. Then the second exposure module 220 may put the plurality of parameter groups into Equations (9) and (10) bellow:

$$E_0=c_1(T)+c_2(G)+c_3(A), \qquad (9)$$

$$\lambda=\lambda_T+\lambda_G+\lambda_A, \qquad (10)$$

where $E_0$ (also referred to as Etarget illustrated in Equation (8)) refers to the target exposure value; $\lambda$ refers to a sum of weights; $\lambda_T$ refers to the weight corresponding to the candidate value of the exposure time, $\lambda_T=\lambda_{T1}, \lambda_{T2}, \ldots, \lambda_{TN}$, $\lambda_{Tn-1}<\lambda_{Tn}$, $1<n\leq N$, $\lambda_{T1}$ corresponds to $T_1$, $\lambda_{Tn}$ corresponds to $T_n$; $\lambda_G$ refers to the weight corresponding to the candidate value of the exposure gain, $\lambda_G=\lambda_{G1}, \lambda_{G2}, \ldots, \lambda_{GM}$, $\lambda_{Gm-1}<\lambda_{Gm}$, $1<m\leq M$, $\lambda_{G1}$ corresponds to $G_1$, $\lambda_{Gm}$ corresponds to $G_m$; $\lambda_A$ refers to the weight corresponding to the candidate value of the aperture, $\lambda_A=\lambda_{A1}, \lambda_{A2}, \ldots, \lambda_{AK}$, $\lambda_{Ak-1}<\lambda_{Ak}$, $1<k\leq K$, $\lambda_{A1}$ corresponds to $A_1$, and $\lambda_{Ak}$ corresponds to $A_k$.

According to Equations (9) and (10) and the target exposure value $E_0$ determined in 602, the second exposure module 220 may determie, from the plurality of parameter groups, the one or more candidate parameter groups represented by $(T_{x_0}, G_{y_0}, \ldots, A_{z_0})$, wherein $1\leq x_0\leq N$, $1\leq y_0\leq M$, $1\leq z_0\leq K$.

In some embodiments, the second exposure module 220 may first determine parameter groups that satisfy Equation (9). Then the second exposure module 220 may select, from the parameter groups that satisfy Equation (9), one or more parameter groups of which the sum of weights is maximum as the one or more candidate parameter groups based on an algorithm such as a gradient descent algorithm.

After the one or more candidate parameter groups are determined, the second exposure module 220 may further select one of the one or more candidate parameter groups as a target parameter group. In some embodiments, the values of the one or more exposure parameters in the target parameter group may be determined as the target value for each of the one or more exposure parameters. For example, when the process 600 is applied to dynamic scene monitoring such as road monitoring, in which the shorter the exposure time is, the smaller the streak caused by movement of an object in a captured image is, and the higher the quality of the captured image is, the second exposure module 220 may determine one of the one or more candidate parameter groups with the shortest exposure time among the one or more candidate parameter groups as the target parameter group.

In 604, the second exposure module 220 (e.g., the executing unit 530) may adjust the one or more exposure parameters based on the target value for each of the one or more exposure parameters. In some embodiments, the second exposure module 220 may automatically adjust the one or more exposure parameters based on the target value for each of the one or more exposure parameters.

In some embodiments, for each of the one or more exposure parameters, the second exposure module 220 may obtain a current value of the exposure parameter (e.g., the exposure time) and determine a difference between the current value of the exposure parameter and the target value of the exposure parameter. The second exposure module 220 may also determine a step size based on the difference between the current value of the exposure parameter and the target value of the exposure parameter. For example, if a user wants to adjust the exposure parameter to the target value in N steps, the step size may be determined by dividing the difference between the current value of the exposure parameter and the target value of the exposure parameter by N. In some embodiments, the step size may be determined based on an adjustment time or a subjective feeling of a user caused by brightness change. For example, when the adjustment time is required to be short, the second exposure module 220 may determine a relatively large step size. As another example, when the subjective feeling of the user caused by the brightness change is required to be as comfortable as possible, the second exposure module 220 may determine a relatively small step size. In some embodiments, the second exposure module 220 may further adjust the exposure parameter based on the step size.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, step 601 may be omitted.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method for exposure control implemented on an electronic device having at least one lens to intake scenes, at least one exposure-time controller to control an exposure time, at least one sensor to detect a scene from the at least one lens during the exposure time, and at least one processor to receive electronic signals of an image relating to the scene from the at least one sensors during the exposure time, and control the at least one lens, the at least one exposure-time controller, and the at least one sensor, the method comprising:

obtaining, by the at least one processor, a target frame brightness value of the image;

obtaining, by the at least one processor, an exposure mode of the electronic device;

obtaining, by the at least one processor, an exposure table corresponding to the exposure mode, wherein the exposure table includes a plurality of parameter groups each of which includes a preset value of each of one or more exposure parameter of the capture device, the exposure table includes one or more parts in each of which the preset values of one of the one or more exposure parameters are different, and the preset values of each of the other exposure parameters are equal, respectively;

determining, by the at least one processor, a target value, corresponding to the target frame brightness value, for each of the one or more exposure parameters based on the exposure table; and adjusting, by the at least one processor, one or more of the at least one lens, the at least one exposure-time controller, and the at least one sensor according to the target values of the one or more exposure parameters.

2. The method of claim 1, wherein the determining of the target value, corresponding to the target frame brightness value, for each of the one or more exposure parameters based on the exposure table includes:

obtaining a relationship between the preset value for each of the one or more exposure parameters and a decibel (dB) value corresponding to the preset value;

for each preset value in the exposure table, determining a preset dB value based on the relationship;

for each of the plurality of parameter groups in the exposure table, determining a total dB value by determining a sum of preset dB values of the preset value of each of the one or more exposure parameters in the parameter group;

determining a target brightness dB value corresponding to the target frame brightness value; and determining the target value for each of the one or more exposure parameters based on the total dB value for each of the plurality of parameter groups in the exposure table and the target brightness dB value.

3. The method of claim 2, wherein the determining of the target value for each of the one or more exposure parameters based on the total dB value for each of the plurality of parameter groups in the exposure table and the target brightness dB value includes:

performing a bisection algorithm on the total dB value for each of the plurality of parameter groups in the exposure table based on the target brightness dB value.

4. The method of claim 2, wherein the determining of the target brightness dB value corresponding to the target frame brightness value includes:

obtaining a current frame brightness value and a current value of each of the one or more exposure parameters;

determining a decibel difference between the current frame brightness value and the target frame brightness value;

determining a current dB value for each current value of the one or more exposure parameters based on the relationship; and determining the target brightness dB value by determining a sum of the decibel difference and the current dB value for each current value of the one or more exposure parameters.

5. The method of claim 4, wherein the decibel difference between the current frame brightness value and the target frame brightness value is determined based on a logarithm of a ratio of the target frame brightness value to the current frame brightness value.

6. A system for exposure control, comprising:

at least one lens to intake scenes;

at least one exposure-time controller to control an exposure time;

at least one sensor to detect a scene from the at least one lens during the exposure time; and at least one processor to receive electronic signals of an image relating to the scene from the at least one sensors during the exposure time, and control the at least one lens, the at least one exposure-time controller, and the at least one sensor, wherein when executing a set of instructions, the at least one processor is directed to cause the system to:

obtain a target frame brightness value of the image;

obtain an exposure mode of the electronic device;

obtain an exposure table corresponding to the exposure mode, wherein the exposure table includes a plurality of parameter groups each of which includes a preset value of each of one or more exposure parameter of the capture device, the exposure table includes one or more parts in each of which the preset values of one of the one or more exposure parameters are different, and the preset values of each of the other exposure parameters are equal, respectively;

determine a target value, corresponding to the target frame brightness value, for each of the one or more exposure parameters based on the exposure table; and adjust one or more of the at least one lens, the at least one exposure-time controller, and the at least one sensor according to the target values of the one or more exposure parameters.

7. The system of claim 6, wherein to determine the target value, corresponding to the target frame brightness value, for each of the one or more exposure parameters based on the exposure table, the at least one processor is directed to cause the system to:

obtain a relationship between the preset value for each of the one or more exposure parameters and a decibel (dB) value corresponding to the preset value;

for each preset value in the exposure table, determine a preset dB value based on the relationship;

for each of the plurality of parameter groups in the exposure table, determine a total dB value by determining a sum of preset dB values of the preset value of each of the one or more exposure parameters in the parameter group;

determine a target brightness dB value corresponding to the target frame brightness value; and determine the target value for each of the one or more exposure parameters based on the total dB value for each of the plurality of parameter groups in the exposure table and the target brightness dB value.

8. The system of claim 7, wherein to determine the target value for each of the one or more exposure parameters based on the total dB value for each of the plurality of parameter groups in the exposure table and the target brightness dB value, the at least one processor is directed to cause the system to:

perform a bisection algorithm on the total dB value for each of the plurality of parameter groups in the exposure table based on the target brightness dB value.

9. The system of claim 7, wherein to determine the target brightness dB value corresponding to the target frame brightness value, the at least one processor is directed to cause the system to:

obtain a current frame brightness value and a current value of each of the one or more exposure parameters;

determine a decibel difference between the current frame brightness value and the target frame brightness value;

determine a current dB value for each current value of the one or more exposure parameters based on the relationship; and determine the target brightness dB value by determining a sum of the decibel difference and the current dB value for each current value of the one or more exposure parameters.

10. The system of claim 9, wherein the decibel difference between the current frame brightness value and the target frame brightness value is determined based on a logarithm of a ratio of the target frame brightness value to the current frame brightness value.

11. The system of claim 7, wherein the plurality of parameter groups are arranged in ascending order based on the total dB value.

12. The system of claim 6, wherein the exposure mode includes a shutter priority mode, a gain priority mode, and an anti-streak mode.

13. The system of claim 6, wherein the one or more exposure parameters includes the exposure time, the exposure gain, and the aperture.

14. The system of claim 6, wherein for at least one of the one or more parts in the exposure table, the preset values of the one of the one or more exposure parameters that are different include only a maximum of the one of the one or more exposure parameters and a minimum of the one of the one or more exposure parameters.

15. A system for exposure control, comprising:
at least one lens to intake scenes;
at least one exposure-time controller to control an exposure time;
at least one sensor to detect a scene from the at least one lens during the exposure time; and
at least one processor to receive electronic signals of an image relating to the scene from the at least one sensors during the exposure time, and control the at least one lens, the at least one exposure-time controller, and the at least one sensor, wherein when executing a set of instructions, the at least one processor is directed to cause the system to:
obtain a current frame brightness value of the image, a current exposure value of the image, and a target frame brightness value of the image;
determine a target exposure value based on the target frame brightness value, the current frame brightness value, and the current exposure value, the current exposure value and the target exposure value relating to one or more exposure parameters;
obtain a plurality of candidate values of the one or more exposure parameters based on the target exposure value;
determine a weight corresponding to each of the plurality of candidate values, wherein for each of the one or more exposure parameters, the larger the candidate value is, the smaller the weight corresponding to the candidate value is;
determine a target value for each of the one or more exposure parameters from the plurality of candidate values based on the target exposure value, the plurality of candidate values, and the weight corresponding to each of the plurality of candidate values; and adjust one or more of the at least one lens, the at least one exposure-time controller, and the at least one sensor according to the target values of the one or more exposure parameters.

16. The system of claim 15, wherein to determine the target exposure value based on the current frame brightness value, the target frame brightness value, and the current exposure value, the at least one processor is directed to cause the system to:
multiply the current exposure value by the target frame brightness value; and
determine the target exposure value by dividing the multiplication result by the current frame brightness value.

17. The system of claim 15, wherein an exposure value relating to the target value for each of the one or more exposure parameters is equal to the target exposure value, and a sum of the weight corresponding to the target value for each of the one or more exposure parameters is maximum among the plurality of candidate values.

18. The system of claim 15, wherein the one or more exposure parameters include the exposure time, the exposure gain, and the aperture, and an exposure value relating to the candidate value for each of the one or more exposure parameters is determined by:

$$E=c_1(T)+c_2(G)+c_3(A),$$

wherein, E refers to the exposure value; T refers to the candidate value of the exposure time, $T=T_1, T_2, \ldots, T_N$, $T_{n-1}<T_n$, $1<n\leq N$, N is equal to a positive integer greater than 1, $c_1(T)$ refers to a first function that transforms the candidate value of the exposure time into an exposure time decibel value; G refers to the candidate value of the exposure gain, $G=G_1, G_2, \ldots, G_M$, $G_{m-1}<G_m$, $1<m\leq M$, M is equal to a positive integer greater than 1, $c_2(G)$ refers to a second function that transforms the candidate value of the exposure gain into an exposure gain decibel value; A refers to the candidate value of the aperture, $A=A_1, A_2, \ldots, A_K$, $A_{k-1}<A_k$, $1<k\leq K$, K is equal to a positive integer greater than 1, and $c_3(A)$ refers to a third function that transforms the candidate value of the aperture into an aperture decibel value.

19. The system of claim 18, wherein to determine the target value for each of the one or more exposure parameters, the at least one processor is directed to cause the system to:
determine a plurality of groups each of which includes the candidate value of the exposure time, the candidate value of the exposure gain, and the candidate value of the aperture;
put the plurality of groups into the following equations:

$$E_0=c_1(T)+c_2(G)+c_3(A),$$

$$\lambda=\lambda_T+\lambda_G+\lambda_A$$

wherein, $E_0$ refers to the target exposure value; λ refers to a sum of weights; $\lambda_T$ refers to the weight corresponding to the candidate value of the exposure time, $\lambda_T=\lambda_{T1}, \lambda_{T2}, \ldots, \lambda_{TN}$, $\lambda_{Tn-1}<\lambda_{Tn}$, $1<n\leq N$, $\lambda_{T1}$ corresponds to $T_1$, $\lambda_{Tn}$ corresponds to $T_n$; $\lambda_G$ refers to the weight corresponding to the candidate value of the exposure gain, $\lambda_G=\lambda_{G1}, \lambda_{G2}, \ldots, \lambda_{GM}$, $\lambda_{Gm-1}<\lambda_{Gm}$, $1<m\leq\lambda_{G1}$ corresponds to $G_1$, $\lambda_{Gm}$ corresponds to $G_m$; AA refers to the weight corresponding to the candidate value of the aperture, $\lambda_A=\lambda_{A1}, \lambda_{A2}, \ldots, \lambda_{AK}$, $\lambda_{Ak-1}<\lambda_{Ak}$, $1<k\leq K$, $\lambda_m$ corresponds to $A_1$, and $\lambda_{Ak}$ corresponds to $\lambda_k$;
determine one or more candidate groups from the plurality of groups, each of the one or more candidate groups making the exposure value relating to the candidate value of the exposure time, the candidate value of the exposure gain, and the candidate value of the aperture in the candidate group equal to the target exposure value, and making the sum of weights corresponding to the candidate value of the exposure time, the candidate value of the exposure gain, and the candidate value of the aperture in the candidate group maximum among the plurality of candidate values; and select one of the one or more candidate groups, the candidate value of the exposure time in the selected group being the target value of the exposure time, the candidate value of the exposure gain in the selected group being the target value of the exposure gain, the candidate value of the aperture in the selected candidate group being the target value of the aperture.

20. The system of claim 15, wherein before obtaining the current frame brightness value of the image, the current exposure value of the image, and the target frame brightness value of the image, the at least one processor is further directed to cause the system to:

determine that a difference between the current frame brightness value and the target frame brightness value is greater than a threshold;

determine that the aperture is out of an aperture threshold range corresponding to a lens magnification; or determine that a threshold range of at least one of the one or more exposure parameters is changed.

* * * * *